(12) United States Patent
Woodward et al.

(10) Patent No.: US 11,853,982 B1
(45) Date of Patent: Dec. 26, 2023

(54) USER DASHBOARD FOR ENABLING USER PARTICIPATION WITH ACCOUNT MANAGEMENT SERVICES

(71) Applicant: Freedom Financial Network, LLC, San Mateo, CA (US)

(72) Inventors: Michael Woodward, San Mateo, CA (US); Jon Pedley, San Mateo, CA (US); Jason Pack, San Mateo, CA (US); John McCormick, San Mateo, CA (US); Ryan Sepiol, San Mateo, CA (US)

(73) Assignee: Freedom Financial Network, LLC, San Mateo, CA (US)

( * ) Notice: Subject to any disclaimer, the term of this patent is extended or adjusted under 35 U.S.C. 154(b) by 0 days.

(21) Appl. No.: 16/777,678

(22) Filed: Jan. 30, 2020

(51) Int. Cl.
*G06Q 20/10* (2012.01)
*G06Q 20/22* (2012.01)
*G06Q 40/03* (2023.01)

(52) U.S. Cl.
CPC ......... *G06Q 20/102* (2013.01); *G06Q 20/227* (2013.01); *G06Q 40/03* (2023.01)

(58) Field of Classification Search
CPC .. G06Q 20/102; G06Q 20/227; G06Q 40/025; G06Q 40/03
See application file for complete search history.

(56) References Cited

U.S. PATENT DOCUMENTS

| | | | |
|---|---|---|---|
| 6,456,983 B1 | 9/2002 | Keyes | |
| 6,513,018 B1 * | 1/2003 | Culhane | G06Q 40/00 705/35 |
| 7,860,781 B1 * | 12/2010 | Bodi | G06Q 40/00 705/38 |
| 8,694,430 B2 | 4/2014 | Kobayashi | |
| 10,242,402 B1 * | 3/2019 | Soccorsy | H04L 67/10 |
| 10,268,996 B1 * | 4/2019 | Wannamaker | G06Q 40/125 |
| 10,825,028 B1 | 11/2020 | Kramme | |
| 10,891,037 B1 * | 1/2021 | Mackrell | G06Q 20/1085 |
| 11,509,771 B1 | 11/2022 | Ross | |
| 2002/0046049 A1 | 4/2002 | Siegel | |
| 2002/0138409 A1 | 9/2002 | Bass | |
| 2003/0105688 A1 * | 6/2003 | Brown | G06Q 40/02 705/31 |

(Continued)

FOREIGN PATENT DOCUMENTS

| | | | | |
|---|---|---|---|---|
| WO | WO-0157756 A1 * | 8/2001 | | G06Q 10/06312 |
| WO | WO-03048996 A1 * | 6/2003 | | G06Q 20/04 |

OTHER PUBLICATIONS

"How to Read your Escrow Statement", found on line at https://www.spservicing.com/Content/pdf/HowToReadStatement_BKEscrowStatement.pdf (Year: 2017).*

(Continued)

*Primary Examiner* — Scott C Anderson
*Assistant Examiner* — James H Miller
(74) *Attorney, Agent, or Firm* — MAHAMEDI IP LAW LLP

(57) ABSTRACT

A network computing system to provide an account management service for guiding user actions and providing users with information to facilitate decision making. In providing the account management services, the network computer system makes predictive determinations about the actions of service providers, in connection with specific actions of individual users.

5 Claims, 9 Drawing Sheets

(56) References Cited

U.S. PATENT DOCUMENTS

| | | | |
|---|---|---|---|
| 2004/0019560 A1 | 1/2004 | Evans | |
| 2004/0243508 A1 | 12/2004 | Samson | |
| 2006/0080197 A1 | 4/2006 | Chi | |
| 2006/0293983 A1 | 12/2006 | Rosenblatt | |
| 2007/0156557 A1* | 7/2007 | Shao | G06Q 40/00 705/35 |
| 2009/0125375 A1 | 5/2009 | Bateni | |
| 2009/0276368 A1 | 11/2009 | Martin | |
| 2010/0111287 A1 | 5/2010 | Xie | |
| 2010/0217706 A1 | 8/2010 | Griffin | |
| 2011/0119169 A1* | 5/2011 | Passero | G06Q 40/02 705/35 |
| 2011/0161155 A1* | 6/2011 | Wilhelm | G06Q 30/04 705/14.27 |
| 2011/0178922 A1* | 7/2011 | Imrey | G06Q 40/02 715/833 |
| 2011/0276383 A1* | 11/2011 | Heiser, II | G06Q 30/0224 705/14.25 |
| 2013/0085936 A1 | 4/2013 | Law | |
| 2013/0179338 A1* | 7/2013 | Evans | G06Q 20/108 705/40 |
| 2013/0290165 A1 | 10/2013 | Cerise | |
| 2015/0046214 A1 | 2/2015 | Jain | |
| 2015/0379488 A1* | 12/2015 | Ruff | G06Q 40/06 705/40 |
| 2016/0232546 A1 | 8/2016 | Ranft | |
| 2017/0013131 A1 | 1/2017 | Craib | |
| 2017/0262821 A1* | 9/2017 | Imrey | G06Q 20/02 |
| 2018/0012300 A1* | 1/2018 | Imrey | G06Q 40/03 |
| 2018/0082372 A1* | 3/2018 | Diana | G06Q 40/03 |
| 2019/0130016 A1* | 5/2019 | Jennings | G06F 16/283 |
| 2020/0074539 A1* | 3/2020 | Palaghita | G06Q 40/03 |
| 2020/0074540 A1* | 3/2020 | Wolfe | G06Q 40/03 |
| 2020/0265443 A1* | 8/2020 | Shah | G06Q 30/016 |
| 2020/0351403 A1 | 11/2020 | George | |
| 2020/0402625 A1 | 12/2020 | Aravamudan | |
| 2020/0410583 A1 | 12/2020 | Hart | |
| 2021/0081271 A1 | 3/2021 | Doshi | |
| 2021/0133670 A1 | 5/2021 | Cella | |
| 2021/0142384 A1 | 5/2021 | Nori | |
| 2021/0201359 A1 | 7/2021 | Sekar | |
| 2021/0256084 A1 | 8/2021 | Marsh | |
| 2022/0345543 A1 | 10/2022 | Oleinikov | |

OTHER PUBLICATIONS

12 CFR 1024.17 (Year: 2017).*

Authors: B. Landfeldt et al: User Service Assistant: an end-to-end reactive QoS architecture; Date of Conference: May 18-20, 1998 Date Added to IEEE Xplore: Aug. 6, 2002 (Year: 2002).

Authors: Xin Bai et al: Coordination in Intelligent Grid Environments; Published in: Proceedings of the IEEE ( vol. 93, Issue: Mar. 3, 2005) pp. 613-630; Date of Publication: Feb. 28, 2005 (Year: 2005).

* cited by examiner

Online Services

| Bank Account Change | Bank Account Change | Enroll New Debt | Upload Documents |

Warning
Canceling your deposit of $350 on 02/03/2019 will delay your completion of the program by 3 months.
You will also miss an installment payment on 03/3/2019, and you will be in default of your settlement agreement with Bank A. You will owe interest and penalties dating back to December 2, 2018, in the amount of $6412.33.
If you need to reduce your deposit schedule, you can save your program and avoid default with this revised deposit schedule.

— 362
— 364
— 366
— 360

Select an Option:

○ Cancel your $350.00 deposit on 02/03/2020 and schedule an additional deposit of $350.00 before 03/04/2020

○ Continue with canceling your $350.00 on 02/03/202 deposit and don't schedule an additional deposit ○ I want to revise my deposits and save my program under the revised deposit schedule.

| Apr. 2023 Current Est. Graduation Date | June 2023 New Estimated Grad. Date |
| Cancel ✕ | Continue |

< Back

FIG. 3C

USER DASHBOARD FOR ENABLING USER PARTICIPATION WITH ACCOUNT MANAGEMENT SERVICES

TECHNICAL FIELD

Examples described herein relate to network services, and more specifically, to a user dashboard for enabling user participation with account management services.

BACKGROUND

While account management services have been in existence for decades, the availability of such services have significantly expanded with the growth of the World Wide Web and the availability of backend network computing services. Through use of network computing services, providers are more readily able to acquire information from users for purpose of providing numerous types of account management services. The network computing services are also increasingly capable of preventing unauthorized access to user accounts and information.

Numerous types of account management services are available to users through websites, mobile applications and other online resources. For example, users can subscribe to services that monitor user accounts for fraud and misuse, which can often be detected by detecting a certain type of user activity that deviates in some way from past or current information that is known about the user. By way of example, if account activities are detected on a user account in two different geographic locations, there is a likelihood that the user's account is flagged for fraud prevention. In this way, many service providers use their access to user information (e.g., activities of the user) to provide services that are of benefit to the user. While there are numerous types of services in which users can benefit from account management services based on the user's willingness to shared their information (e.g., user opts-in or subscribes to a credit monitoring service which monitors credit usage of the user), users generally have more limited access to information about the activities and actions of the service providers.

BRIEF DESCRIPTION OF THE DRAWINGS

FIG. 3A through FIG. 3C illustrate a user dashboard for facilitating user participation in connection with an account management service provided by a network computing system, according to one or more examples.

DETAILED DESCRIPTION

Figure 1:
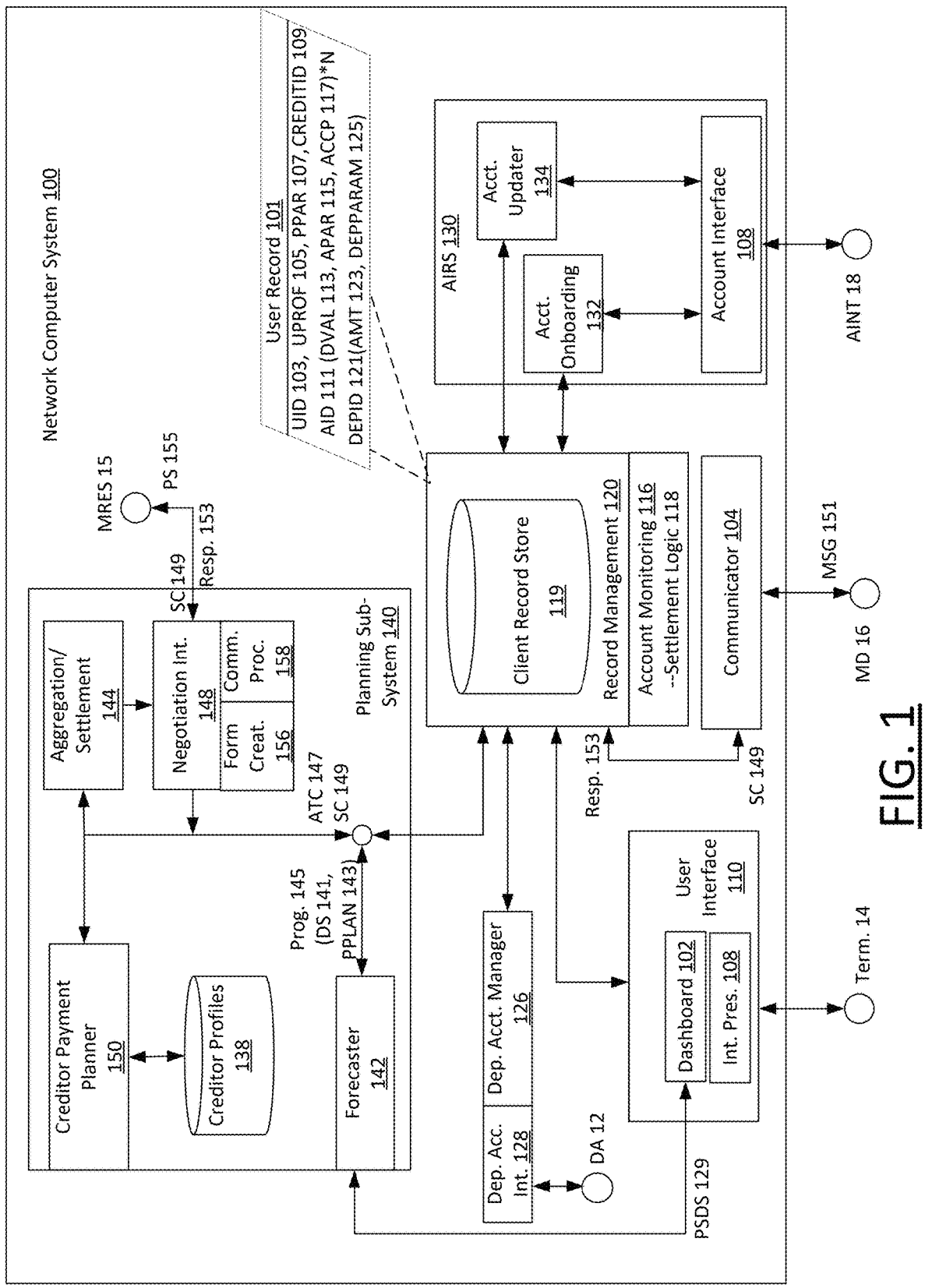
FIG. 1 illustrates a network computing system to provide account management services, according to one or more examples.

Debt settlement services refer to a type of account management service for settling high-interest debts of consumers. Generally, an objective of the any debt settlement service is to enable the consumer to settle an outstanding debt for less than the total amount owed, under a timeline which prevents the user from becoming insolvent. If successful, a debt settlement service can benefit a user by eliminating the consumer's debt for a significantly lesser amount than what is owed. In many cases, the creditor also receives a benefit because a user seeking relief is likely unable to pay down the debt, but through settlement of the outstanding debt, the creditor avoids an alternative outcome where the debtor files for bankruptcy and the creditor receives no payment for the user's outstanding debt. In this respect, debt resolution services can facilitate debtors and creditors in reaching an efficient outcome, rather than a protracted and inefficient outcome where the user's debt becomes uncollectible and the user faces ruined credit.

While debt settlement services can facilitate debtors and creditors in reaching an efficient outcome, the use of debt settlement services can come with significant risk. For debtors, much of the risk comes by way of the debtor having to take actions which would be harmful to the user's credit or reputation if debt settlement is not successful. For example, if the service provider is unable to reach a settlement with the creditor, the debtor may be left in a state of significantly greater debt as compared to a state in which no debt settlement service was provided to the user. Moreover, by following a program provided by the settlement provider, the user may be subject to collection escalation, including legal action which can result in greater debt and more significant legal consequences for amounts owed on a creditor account. For the service provider, the risk associated with the debt settlement being unsuccessful can include loss of fees which the service provider would otherwise be entitled to receive for their efforts.

In many cases, the primary factor that determines whether or not a debt settlement effort is successful is the decision of the creditor—specifically, whether or not the creditor agrees to accept a settlement amount that is significantly less than the amount the user owes. This determination can be influenced by several other factors, such as the period of the debtor's delinquency, the amount owed, the credit history of the debtor and the creditor's policy towards debt settlement. The debt settlement decision made by the creditor can be also be enclosed by many factors that are outside of the control of the service provider or creditor. For example, the debt settlement decision of the service provider can be subjective, or subject to company policy that changes over time and in response to considerations that are not necessarily directly related to the debtor or even to the credit services provided by the creditor. Ultimately, from the perspective of the service provider and the debtor, there is a level of uncertainty as to what the creditor will accept as a settlement to resolve outstanding debt.

In examples, a network computing system provides an account management service to guide a user in resolving outstanding debt with creditors. The functions provided with the account management service include: (i) guiding the user as to what actions the user should take to resolve an outstanding debt with a creditor, and (ii) providing information to the user to enable the user to make decisions that are informed as to future consequences. In guiding the user actions and providing the account management service, the network computing system can predict the creditor's actions, so as to minimize negative consequences of the user actions. Additionally, in examples, the network computer system is scaled to aggregate its acquisition and processing of creditor information in order to more accurately predict creditor actions.

According to some examples, a network computing system maintains a collection of user profiles, where each user profile associates an identifier of the user with (i) one or more deposit accounts, (ii) a creditor account associated with a corresponding creditor, and (iii) a creditor payment schedule. For each user, the creditor payment schedule can further identify at least one of (a) an installment payment that is to be made from the one or more deposit accounts to the creditor on one or multiple scheduled dates, or (b) a portion of a settlement amount that the user has remaining to pay under the creditor payment schedule to settle an amount originally owed to the creditor. The network computing system monitors the one or more deposit accounts to determine a deposit amount of the one or more deposit accounts. Additionally, the network computing system provides an interactive user-interface to the user that includes information about the creditor payment schedule, including an upcoming payment and a scheduled date for making the upcoming payment. The network computing system further provides, via the interactive user-interface, one or more alternative payment schedules for one or more alternative scenarios in which the deposit amount is insufficient for the upcoming payment.

In some examples, the network computing system maintains a collection of creditor profiles, where each creditor profile includes historical information that is indicative of one or multiple settlement decisions the creditor has made in a prior time interval. The network computing system also maintains a collection of user profiles, where each user profile associates an identifier of the user with (i) one or more deposit accounts, (ii) multiple creditor accounts, each of the multiple creditor accounts being associated with a corresponding creditor of the collection of creditors, and (iii) a payment schedule for each creditor account of the collection. The payment schedule further identifies a payment date and a settlement amount for each creditor account of the multiple creditor accounts, including a completion date when each of the multiple creditor accounts are settled. For each user of the plurality of users, the network computing system determines a deposit schedule for the user and the one or more deposit accounts, where the deposit schedule identifies a deposit amount contribution that the user is expected to make to a deposit amount held with one or more deposit accounts on multiple occasions over an upcoming time interval. The network computing system determines creditor account information for each of the multiple creditor accounts, where the creditor account information identifies (i) a credit amount that is owed by the user on each of the multiple creditor accounts, and (ii) a delinquency state of the creditor account; and (iii) one or more creditor account parameters, including an interest rate parameter that identifies a rate at which the credit amount owed on the creditor account increases. Further, the network computing system predicts a set of settlement decisions that individual creditors will make for a given user based on the historical information included with the respective creditor profile and the creditor account information of a corresponding creditor account of the user. The set of settlement decisions can include (i) a date range corresponding to a portion of the time interval during which the user can be delinquent on making payment to the account without the creditor of the creditor account triggering a collection escalation, (ii) a percentage of the credit amount that the creditor will accept as a settlement amount to settle the credit amount in full, and (iii) a payment type which the creditor will accept for payment of the settlement amount. Based on the predicted settlement decisions and the deposit schedule, the network computing system determines the payment schedule to settle the credit amount that is owed by the given user on each of the multiple creditor account of the given user, over the upcoming time interval. Additionally, the network computing system provides the payment schedule to the user.

Still further, according to some examples, a network computing system programmatically monitors one or more deposit accounts to determine a deposit amount that is available to a user. The network computing system determines a deposit schedule for the user and the one or more deposit accounts, where the deposit schedule identifies a deposit contribution that the user is expected to make, to increase the deposit amount of at least one of the one or more deposit accounts on multiple occasions over a time interval that extends to a future completion date. Additionally, the network computing system programmatically monitors multiple creditor accounts of the user to determine a credit amount that is owed by the user on each of the multiple creditor accounts, where each creditor account is associated with a set of creditor account parameters, including an interest rate parameter that identifies a rate at which the credit amount owed on the creditor account increases. Based at least in part on the deposit schedule, the network computing system forecasts the deposit amount that is available to the user at multiple instances over the time interval. For each of the multiple creditor accounts, the network computing system forecasts, based at least in part on the interest rate of the creditor account, the credit amount that will be outstanding on the creditor account of the user at multiple instances of the time interval. Based on the forecasted deposit amounts of each of the one or more deposit accounts and the forecasted credit amounts of each of the multiple creditor accounts, the network computing system determines a payment schedule to settle the credit amount that is owed by the user on each creditor account over the time interval, where the payment schedule identifies a payment date and a settlement amount for each creditor account of the multiple creditor accounts. The network computing system generates an interactive presentation to display the payment schedule to the user, where the interactive presentation includes an input feature to enable the user to vary the deposit schedule. In response to the user interacting with the input feature to provide an input to vary the deposit schedule, the network computing system determines an alternative payment schedule based on the input, and the network computing system updates the interactive presentation to display the alternative payment schedule based on the user input.

Still further, in some examples, the network computing system identifies, from a plurality of user records, a plurality of accounts, including a first account of a first user. The network computing system performs a first delinquency analyses on the identified first account to determine a likelihood of the first account being delinquent by a predetermined amount of time. Based on a first result of the first delinquency analyses of the first account and results of delinquency analyses for the identified plurality of accounts, the network computing system identifies a set of communication parameters for transmitting a communication to the first user regarding the first account, where the set of communication parameters includes a communication channel for transmitting the communication to the first user. The network computing system transmits, to the first user, the communication regarding the first account in accordance with the set of communication parameters.

As used herein, a client device refers to devices corresponding to desktop computers, cellular devices or smartphones, wearable devices, laptop computers, tablet devices, television (IP Television), etc., that can provide network connectivity and processing resources for communicating with the system over a network.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices) are all examples of machines and devices that utilize processors, memory, and instructions stored on computer-readable mediums. Examples of mobile devices include, for example, smartphones and multifunctional devices capable of voice-telephony and messaging using wireless networks, including devices that communicate over the Internet using a cellular network (e.g., such as CDMA (Code Division Multiple Access) network, GSM (Global System for Mobiles) network, or LTE (Long Term Evolution-Advanced) network), as well as devices that utilize WiFi (e.g., wireless communications as promulgated under 802.11(g), 802.11(n), 802.11 (ac), etc.) or other wireless communication channels for Internet access. Additionally, embodiments may be implemented in the form of computer-programs, or a computer usable carrier medium capable of carrying such a program.

System Description

FIG. 1 illustrates an example network computing system to provide account management services for users. The network system 100 can be implemented by programs, modules and/or programmatic services that operate on the network system 100 to provide functionality as described by various examples. With respect to examples as described, the network system 100 can be implemented on a server, on a combination of servers, and/or on a distributed set of computing devices which communicate over a network such as the Internet. Still further, some examples provide for the network computing system 100 to be distributed using one or more servers and/or user devices. The users of system 100 can access an account management service under which they are enrolled, to view information and take actions as may be requested. Under an implementation, users can operate a browser running on a user terminal 14 to access the account management service(s) of system 100. In another implementation, users can access the account management service(s) of the network computing system 100 using a dedicated application, such as a mobile application running on a mobile device 16 of the user. As described herein, users of the network computing system 100 can refer to end-users or customers of the account management services. In some instances, users of the network computing system 100 can also refer to agents or specialist (e.g., account servicing agents, settlement negotiators, account specialists, etc.) who act on-behalf of the end-user or customer.

According to examples, a person can operate user terminal 14 (e.g., desktop computer, laptop, mobile computing device) to enroll for an account management service provided by the network system 100. As described with various examples, a user can enroll to receive account management services provided by the network system 100 to, for example, manage debt and assets, as well as to receive other types of financial services. In some examples, the network system 100 enables users to subscribe and participate in services that are designed to reduce financial debt and/or to allocate capital to debt in a manner that is optimal for the user.

In examples of FIG. 1, the network system 100 includes a user interface component 110, a record management component 120, an account information retrieval sub-system ("AIRS") 130, and a planning sub-system 140. The user interface component 110 records user input that is provided through user interaction with one or more interactive presentations 108 during a given user session. The user interface component 110 can, for example, communicate with a browser component on a user terminal to generate one or more interactive presentations 108. Alternatively, the user interface component 110 can include or communicate with a service application (e.g., "app") on the user's computing device (e.g., mobile device) to generate one or more interactive presentations 108.

To enroll, a user initiates a session with the network system 100 by accessing a website, or by downloading and opening a service application, to receive an interactive presentation 108 that prompts the user for enrollment information. For example, the user may be provided an enrollment form, where the specifies personal identifiers (e.g., legal name, address, social security number, etc.), account identifiers (e.g., creditor account numbers) and other information. As contemplated herein, the user interacting with the interactive presentation 108 provided by the network system 100 can be the customer or end-user of the account management services. Additionally, the user interacting with the interactive presentation 108 can be an agent acting on behalf of the customer or end-user. For instance, an agent can enroll the customer with the account management services by interacting with the interactive presentation 108 (e.g., inputting information via the interactive presentation 108 when speaking to the customer over the phone).

The records management component 120 maintains a data store of user records ("user record store 119"). Records management component 120 can implement operations to maintain and update the record store 119. When new user information is received (e.g., through an enrollment form), records management component 120 creates the corresponding user record 101 and records information provided by the user during the enrollment process with a corresponding user record 101. In examples, records management component 120 can generate and associate a unique user identifier 103 (e.g., account management service identifier) with the corresponding user record. During the enrollment session, or in a subsequent onboarding session, the user can also specify, via an interactive presentation 108 of the user interface component 110, (i) one or more creditor identifiers 109 (e.g., a name of credit card issuer) to which the user has an outstanding debt, and/or (ii) one or more creditor account identifiers 111 (e.g., credit card number). Additionally, the user can specify various types of parametric information, such as account credentials 117 for enabling network login of one or more of the user's creditor accounts. The user may also specify profile information 105, such as messaging identifiers of the user (e.g., email address, instant messaging or social network identifier, mobile device phone number, etc.), the user's residence address, and user preference(s) (e.g., preferred form of communication for messages sent in connection with the account management service that is being received).

Deposit Account Interface

As part of the account management services provided by the network system 100, the user may be required to open or maintain a deposit account 12, and to provide the network system 100 with permission to access the deposit account 12 for specific purposes. The deposit account 12 may be established as, for example, an interest-bearing account (e.g., savings account) or operating account (e.g., checking account) where funds available to the user are maintained. To complete enrollment, the user may input deposit account information 121 through, for example, an enrollment form, and records management component 120 may record the deposit account information 121 as part of the user's record 101. In examples, the deposit account information 121 can initially include (i) an account identifier that identifies the deposit account with a third-party institution, (ii) credentials for enabling system 100 to remotely access the deposit account, (iii) an amount 123 which the user has deposited in total with the deposit account and/or one or more deposit contributions of the user, and (iv) a deposit schedule 125 under which the user is expected to make a series of planned contributions to the deposit account. In some examples, the user may specify an initial deposit schedule 125 based on, for example, payment requirements of the individual creditor accounts which the user has enrolled. As described with examples, the deposit schedule 125 may be altered based on determinations of the network system 100.

The network system 100 may include a deposit account manager 126, which includes a programmatic interface 128 to access the user's deposit account using deposit account credentials (e.g., login and password). At the time of the user's enrollment, deposit account manager 126 can independently access the user's deposit account to verify information provided by the user. Subsequently, once the user is enrolled, deposit account manager 126 can access the user's deposit account to verify or otherwise record information that identifies deposit contributions the user makes to the deposit account, in accordance with the user's deposit schedule 125. In examples, deposit account manager 126 can, for example, periodically record the deposit account information 121 (e.g., total amount 123 available in deposit account 12, amount of recent payment, etc.).

On Boarding Creditor Accounts

The account information retrieval sub-system ("AIRS") 130 includes processes and components for enabling automated and programmatic retrieval and determination of information relating to creditor accounts that individual users have with different creditors (e.g., third-party institutions). The AIRS 130 can include onboarding component 132 to collect or verify creditor account information provided by users. The onboarding component 132 can also implement processes to locate and determine a status of the user's creditor accounts, as identified by corresponding creditor account identifiers 111.

In examples, onboarding component 132 determines which identified creditor accounts include credentials for enabling the network system 100 to access and retrieve creditor information from third-party account interfaces 18. If the credentials for an identified creditor account of the user results in onboarding component 132 being able to successfully access the account, the creditor account information for that particular account may be verified. If the account cannot be verified through credentials, then onboarding component 132 may utilize an alternative set of identifiers (e.g., last name, social security number, creditor account information, etc.) to attempt to locate and verify the status of the account. For example, onboarding component 132 can initiate an account locator process that uses a telephonic connection and Dual Tone-Multi Frequency ("DTMF") to attempt to locate a creditor account through the creditor's telephone service. If the account cannot be located through use of different user identifiers, then onboarding component 132 may flag the particular account as having an unknown status. As an addition or variation, when a specified creditor account is not locatable with the creditor, additional processes can be triggered to determine if the account has been escalated in collections (e.g., user's creditor account transferred to collection entity or subject to litigation). If the state of the user's creditor account is determined to be one in which collections-related escalation has occurred, then the account status may be recorded as such with the corresponding user record 101, and the particular creditor account may be subjected to an alternative creditor settlement process. On the other hand, the account is located by the onboarding component 132, the information the user provided with respect to the account may be deemed verified.

To onboarded accounts, the account updater 134 may utilize the provided credentials 117 to retrieve and record corresponding creditor account information 115. The creditor account information may include (i) a credit amount that is owed by the user on that account, (ii) a delinquency state of the creditor account, and (iii) one or more creditor account parameters, including an interest rate parameter that identifies a rate at which the credit amount owed on the creditor account increases. The account updater 134 may implement the retrieval operations repeatedly, such as on a weekly or monthly basis, so that the creditor account information 115 for the user record remains current.

Planning Sub-System

According to examples, planning sub-system 140 determines a personalized program 145 for individual users, with an objective of the program being to eliminate debt which the user has identified through enrolled creditor accounts. The program 145 may be designed to extend for a given duration (e.g., 2 or 4 years) to a future date, at which time the amounts owed on the enrolled creditor accounts of the user are eliminated. As described in more detail, planning subsystem 140 can generate a personalized program 145 for a given user that includes (i) an updated deposit schedule 125 under which a user makes deposit contributions to the deposit account 12, and (ii) a creditor payment plan 143 that sets the schedule under which each creditor of one of the user's creditor accounts receives payment from the deposit account 12. The creditor payment plan 143 can also specify actions the user should take on a creditor account, such as not pay or hold off on paying amounts towards the creditor account until the creditor account is settled.

Accordingly, in examples, the deposit schedule 125 can be separate from the payment schedule 143. For example, the deposit schedule 125 can specify for monthly deposit contributions, while the payment plan 143 may plan for one-time payments several months in the future. Thus, for example, the deposit schedule 125 may provide for the user to making a series of payments (e.g., monthly payments) to accumulate the deposit amount, without any amounts being paid towards a creditor account. In examples, the payment plan 143 can be executed by the deposit account manager 126, in accordance with the payment plan 143, and without user input, while the deposit contributions are made by the user to the deposit account 12.

In examples, planning subsystem 140 includes a creditor account forecaster 142, a creditor payment planner 150 and a creditor profile store 138. The forecaster 142 can retrieve, from the user record store 119, the creditor account information 115 for each user's creditor account, including interest rate, amount owed on the creditor account, and penalties which the creditor may be expected to charge for missed payments by the user. Based on a current set of creditor account information 115, the forecaster 142 can determine the amount that will be owed on individual creditor accounts over a future time interval. In forecasting the amounts that will be owed on the different creditor accounts, the forecaster 142 may also take into account amounts which can or may be paid to the creditor accounts at one or more future dates (e.g., future monthly payments).

In examples, the forecaster 142 can run one or multiple simulations for a given creditor account. In a first type of simulation, an assumption may be made that no amounts of the deposit account 12 are paid to the creditor account until a given milestone is reached (e.g., passage of a given duration of time). In such simulations, the forecaster 142 can determine the amount owed on a creditor account based on the interest in the account, and in some variations, the forecaster 142 can also account for penalties which are charged on the account for missed payments. In variations, the forecaster 142 can run simulations where payments are made to a creditor account at different times, such as a series of installment payments which are assumed to initiate several months in the future.

The forecaster 142 can generate creditor account forecast information 139 for each of the creditor accounts, where the creditor account forecast information 139 estimates one or more future states of a corresponding creditor account at a particular moment in time. In this way, the creditor account forecast information 139 can reflect a ledger projected over a future time interval, so as to show the state of a creditor account at one or multiple instances of the future time interval. The forecaster 142 may determine the state of the creditor account at each instance of the future time interval to include (i) amounts (if any) applied to a creditor at one or multiple instances of a future interval, (ii) amounts added to the creditor account from interest and penalties, and (iii) the total amount owed on the particular creditor account.

As the user progresses through the program 145, the forecaster 142 can repeatedly determine creditor account forecast information 139 for each of the creditor accounts. If the forecaster 142 determines that the creditor account forecast information 139 changes as between instances or over a given time interval, the forecaster 142 can signal an alert, as the change can reflect an event that can impact the progression of the program 145 for the user. For example, if the forecaster 142 determines the creditor account forecast information 139 for a future month on a first occasion, then on a next instance (e.g., week later), determines the creditor account forecast information 139 for the same month to be different, the forecaster 142 can signal an alert to reflect an event such as an unexpected charge or increase in one or more of the creditor accounts.

The forecaster 142 may also repeatedly determine the creditor account forecast information 139 for individual creditor accounts when creditor payment planner 150 updates the payment plan 143 for the user. The forecaster 142 can, for example, reflect step- or one-time payments that are projected to reduce or eliminate a portion of an amount owed on a particular creditor account. The forecaster 142 can also forecast the deposit amount available to the user at various future time intervals, based on a given deposit schedule 125, the creditor account forecast information 139 of each creditor account, and the determined payment plan 143.

Creditor payment planner 150 includes processes for predicting a series of settlement decisions for each creditor account of the user. In examples, the predicted settlement decisions that are made for each creditor account of the user include: (i) a date range corresponding to a portion of the planned duration during which the user can be delinquent on making payment to the creditor account without the creditor of the creditor account triggering a collection escalation, (ii) a percentage of the creditor amount owed that the creditor will accept as a settlement amount to settle the credit amount in full, and (iii) a payment type which the creditor will accept for payment of the settlement amount.

In determining the predicted settlement decisions, creditor payment planner 150 can access and use historical information recorded with individual creditor profiles of the creditor profile store 138. For example, creditor payment planner 150 may access historical information of the respective creditor profile to determine the number of days in which the creditor has allowed other users to be delinquent before triggering escalation of the user's account. To obtain sample points for acceptable delinquency periods, creditor payment planner 150 can record instances when a particular creditor escalates an enrolled account of another user. In such cases, the number of days in which the other user was delinquent prior to the escalation occurring can be recorded and averaged with other occurrences of the same creditor.

Likewise, creditor payment planner 150 may use historical information of the respective creditor profile to determine a percentage of the total amount owed on the creditor account that the creditor may accept as settlement. Creditor payment planner 150 may use the historical information to determine an average, or running average of the percentage of the total creditor amount owed by other users which the creditor has recently, or in a relevant prior duration, accepted as settlement for amounts owed. In some variations, creditor payment planner 150 may also use the historical information to determine an optimal date range where the creditor is most likely to accept a desired percentage range of the total creditor amount owed as settlement.

Additionally, historical information may be used to determine the likelihood that the creditor will accept settlement as a one-time payment versus a series of installments. For example, the number of instances in which the creditor requires an installment plan to settle an amount owed on a corresponding creditor account may be averaged and compared to the number of instances in which the creditor allows for a user to make a one-time payment after a deferral period.

In some variations, creditor payment planner 150 may utilize models that use numerous correlative signals that factor or influence a given creditor's settlement decisions. By way of example, creditor payment planner 150 may utilize generalized linear models, random forest, decision trees, neural networks or other predictive decision making models to predict the creditor's settlement decisions, using historical data as training information. In this way, the models may more accurately predict creditor's decisions based on, for example, user-specific factors (e.g., user credit history or past experience with creditor), or even factors such as lending rate or time of year or quarter.

In examples, creditor payment planner 150 can generate a payment plan 143 that specifies an amount and future date for making payment towards an amount owed on a creditor account using funds from the user's deposit account. Creditor payment planner 150 may determine the payment plan 143 based at least in part on the creditor account forecast information 139 and the predictive settlement decisions which are made for each of the creditors.

In an aspect, creditor payment planner 150 can structure the payment plan 143 so that a payment date (e.g., payment date) or payment interval (e.g., installment agreement) for individual creditors are sequenced relative to payment date/interval of other creditors. In this way, creditor payment planner 150 can structure the payment plan 143 to meet one or more objectives. According to examples, creditor payment planner 150 structures the payment plan 143 based on one or more of (i) an objective to minimize an amount that the user contributes to the debit account to settle the creditor accounts, (ii) an objective to avoid escalation on any creditor account, and/or (iii) an objective to prioritize or deprioritize payment of one creditor over other creditors. Still further, in some variations, creditor payment planner 150 may structure the payment plan 143 to include multiple stages, where each stage corresponds to a portion of an overall duration preceding a planned completion date for the user. In such examples, creditor payment planner 150 may include additional or alternative objects as those used for a later stage. For example, creditor payment planner 150 may structure the payment plan to settle those creditor accounts which can be settled in a relative short interval.

Additionally, the credit payment planner 150 can structure the payment plan 143 to plan for anticipated settlements which are predicted to be installment payments. If the credit payment planner 150 predicts that a creditor will require an installment agreement, the credit payment planner 150 may structure the payment plan 143 to accommodate the reoccurring installment payments which are anticipated to be required. In some implementations, the credit payment planner 150 can further structure the payment plan 143 to use accumulated deposit amounts from the deposit account 12 for some or all of the installment payments. Still further, the credit payment planner 150 can structure the deposit schedule so that the user pays towards multiple creditor accounts during a given period. For example, the user may be required to make deposit contributions on a monthly basis, with a portion of each deposit contribution being dedicated for a planned installment payment, while another portion of the deposit contribution is for a planned settlement that has yet to be negotiated. In determining the deposit schedule and/or payment schedule, the network system 100 can determine utilizations (e.g., prioritization of accounts in the settlement process) the deposit account for the purposes of settling the creditor accounts of the user.

Creditor payment planner 150 can structure a user's payment plan 143 (e.g., the sequence in which individual creditors are paid off) based on the creditor account forecast information 139 and the predicted settlement decisions which are made for each creditor account. In examples, creditor payment planner 150 determines, based on the predicted settlement decisions, the likely permissible length of time (if any) which payment for individual creditor accounts of the user can be deferred. Creditor payment planner 150 can also use the creditor account forecast information 139, as determined by the forecaster 142, to determine the cost for delaying payment to each creditor account within the likely permissible length of time. In this way, creditor payment planner 150 structures the payment plan so that payments to individual creditors are sequenced relative to payments to other creditors, for purpose of advancing one or more objectives (e.g., minimizing the amount used to settle all of the creditor accounts and minimizing the likelihood of escalation).

The planning sub-system 140 may determine the deposit schedule 125 with an objective of having the user's deposit contributions over the duration of the program be sufficient for settling amounts owed on the user's enrolled creditor accounts. Accordingly, the deposit schedule 125 can be modified from, for example, the user's initial input, in order to accommodate the creditor payment plan 143, as determined for the user under the user's program 145. As part of the enrollment process, the user may be requested to make a series of deposit account contributions to the deposit account 12 (e.g., monthly deposits to deposit account 12).

In examples, creditor payment planner 150 can determine or influence the deposit schedule 125 under which the user makes deposit contributions to the deposit account 12. In some, the amount of individual deposit contributions may be based on planned payment dates and amounts as specified by the payment plan 143. In variations, the user may, for example, at time of enrollment specify an amount that the user is able to contribute to the deposit account 12 at periodic intervals (e.g., monthly). In some variations, creditor payment planner 150 can generate the payment plan 143 based on an objective of minimizing the user's periodic payments (rather than minimizing the amount expended to settle the amounts owed the respective creditors). Creditor payment planner 150 can also generate recommendations, based on an objective of committing a given deposit amount towards one or more of the creditor accounts of the user, within a given time interval. Accordingly, the creditor payment planner 150 may increase or decrease the periodic deposit contributions of the deposit schedule 125 to meet the payment amounts which may be required under the payment plan 143. The creditor payment planner 150 can increase or decrease periodic deposit contributions based on, for example, reevaluation of the predicted settlement decisions for the user, events which signal an unexpected change to the financial state of a given creditor account, and/or a missed deposit contribution by the user.

In examples, creditor payment planner 150 can update the payment plan 143 for a user based on a variety of events. Creditor payment planner 150 can, for example, respond to a change in the creditor account forecast information 139 (e.g., increase in amount owed) of one or more creditor accounts, and/or the user missing a planned payment under the deposit schedule 125. Still further, creditor payment planner 150 can monitor historical information associated with the profile of individual creditors, as a response to instances when a creditor deviates from an expected course of conduct with regard to account management services provided to another user. In addition or as an alternative, a system administrator can also manually update creditor information without having to wait for historical information associated with the profile of individual creditors to be updated. When the creditor deviates significantly from the expected course of action, creditor payment planner 150 can use a rule-based approach, or alternatively, make an alternative set of predictions as to how the particular user's creditor account is handled in the user's payment plan 143. In such cases, creditor payment planner 150 can redetermine the payment plan 143 to, for example, reflect an alternative sequence as between creditors of a payment plan 143.

As described with examples of FIG. 2A and FIG. 3A through FIG. 3C, the dashboard 112 of the user interface 110 can enable the user to alter the amount of his or her deposit schedule 125 to see how the state of one or more creditor accounts would change. Based on user input provided through the dashboard 112, the forecaster can forecast the deposit schedule 125 for a future time interval (e.g., remainder of the user's program), taking into account individual payments made towards the user's creditor accounts in accordance with the payment plan 143, as well as the accumulation of interest and penalties on the respective creditor accounts.

According to examples, the forecaster 142 can interact with the dashboard 112 to simulate changes to the user's program, resulting from proposed changes to the deposit schedule 125, as indicated by input received from the user via the dashboard 112. In examples, the forecaster 142 can respond to user input to alter the deposit schedule 125 to forecast, for example, changes to the duration of the user's program 145, total cost to the user, and/or the timing of the settlements, etc. In examples, the change to the duration of the user's program can be determined by (i) forecasting the deposit schedule 125 at future intervals based on the user's input indicating the change to the user's future deposit contribution(s), (ii) forecasting the amounts owed on each of the creditor accounts over the future intervals, and (iii) adjusting the payment plan 143 based on the amount available on deposit at the future intervals. The forecaster 142 can communicate with the dashboard 112 to communicate forecasted changes to the user's program, including a change to the duration of the user's program. In this way, the dashboard 112 can communicate simulated changes to the user's program, to facilitate the user in determining whether to implement a change to the deposit schedule 125.

According to examples, the forecaster 142 may be implemented as a module or set of processes that can be triggered to generate one or more ledgers that project the financial state of different creditor accounts based on alternative prospective scenarios, such as variations in either an amount or timing a payment to a creditor. According to an aspect, the forecaster 142 can be initiated by creditor payment planner 150, as described below. In other aspects, the forecaster 142 can be initiated by the user-interface 110, such as in response to user input.

In response to the user specifying a change to the deposit contributions, the forecaster 142 of the network system 100 may recalculate the deposit amount that is available in the user's deposit schedule on periodic intervals for a remainder of the program 145. In response, the forecaster 142 can determine time intervals during the user's program where the amount of the user's deposit schedule 125 is likely sufficient to settle the enrolled creditor accounts of the user.

By way of example, if the user provides input to accelerate the deposit schedule 125, the determinations of the forecaster 142 can identify an earlier time interval (as compared to the current program 145) for when the user's deposit amount is likely sufficient for settling the creditor account, based on the predicted percentage of the outstanding amount owed to settle the creditor account. The forecaster 142 may also determine creditor account forecast information 139 for the creditor account, given the proposed adjusted deposit schedule 125 can result in lesser interest and penalties being accumulated on the enrolled creditor account and/or can achieve better settlement terms on behalf of the user.

As another example, the user can simulate a change to the user's program 145 by specifying input to deaccelerate the deposit schedule 125. For example, the user may specify an input to skip a next deposit contribution, or to reduce a series of deposit contributions going forward. In response to the user input, the forecaster 142 can identify a later time interval (as compared to the current program 145) for when the user's deposit amount is likely sufficient for settling the creditor account, based on the predicted percentage of the outstanding amount owed to settle the creditor account. The forecaster 142 may also determine creditor account forecast information 139 for the creditor account, given the proposed adjusted deposit schedule 125 would result in greater interest and penalties being accumulated on the enrolled creditor account.

In performing a simulation responsive to user input, the forecaster 142 can make the same set of determinations for any additional enrolled creditor accounts which are open (or 'current'). In examples, the forecaster 142 can use the payment plan 143 for the program 145 to identify a sequence or relative timing of when individual creditor accounts are to be settled using funds from the deposit account 12. If the user's program 145 provided for multiple creditor accounts to be settled (e.g., in series) over the duration of the program 145, the forecaster 142 calculates the deposit amounts available for settling the additional creditor accounts in accordance with a simulated alternative deposit schedule 125. The forecaster 142 can determine the likely time interval during which each open (or 'current') creditor account will be settled under a proposed alternative deposit schedule 125 as indicated by the user input. Thus, in response to the user's input to increase or decrease the deposit schedule 125, the forecaster 142 can determine respective accelerated or deaccelerated targeted settlement dates for all remaining current enrolled creditor accounts.

In instances when the user's proposed input generates a shortfall that causes delay in creditor payments under the payment plan 143, the forecaster 142 can be used to determine a saving deposit schedule 129. As described with an example of FIG. 2A, the saving deposit schedule 129 can specify an alternative or additional deposit schedule 125 for the user that can allow for short-term or partial reduction of the deposit schedule 125, while at the same time avoiding potential negative consequences which may otherwise result. By way of example, for creditor accounts which are under settlement to receive installment payments, the forecaster 142 can be used to determine when a proposed reduction in the deposit schedule 125 creates a shortfall that will cause the user to be in default on creditor accounts which are subject to an in-progress settlement (e.g., accounts which are subject to a monthly installment agreement from the user).

Account Monitoring

In examples, records management component 120 includes one or more account monitoring processes 116 to monitor the deposit and creditor accounts of individual users. Deposit account manager 126 can, for example, periodically retrieve and record the user's deposit account information, where the deposit account information 121 identifies the deposit amount which the user has available, as well as information about one or more recent deposit contributions the user has made to the deposit account. The monitoring processes 116 can compare the deposit account information 121 (e.g., the amount 123 available to the user in deposit account 12 and/or the amount of the user's recent deposit contributions to deposit account 12) to expected deposit amounts based on the user's deposit schedule 125. Additionally, the monitoring processes 116 can compare the dates of individual deposit contributions by the user with expected dates when the deposit contributions were actually made.

In examples, when the user's deposit contribution history is deemed to significantly deviate from the user's deposit schedule 125, the monitoring processes 116 may trigger an alert or notification for the user. The monitoring processes 116 may trigger the forecaster 142 to determine the state of one or more of the user's creditor accounts in a simulation that assumes the user has or will miss a recent deposit contribution or set of deposit contributions. The simulated financial state(s) for those creditor accounts can be determined by the forecaster 142 and compared to the case where the user makes the planned deposit contributions, or alternatively, to a simulated case where the user makes a catchup or curing deposit contribution for missed deposit contributions. The simulated alternative financial states can reflect, for example, significantly increased costs for completing the program 145 or delay to the completion date of the program 145 for the user. The monitoring processes 116 can then render, through, for example, the dashboard 112 of the user interface 110, information that details consequences for the user of failing to maintain the deposit schedule, such as increased cost to the user for completing the program 145 or delay to its completion.

Additionally, the account updater 134 may periodically or repeatedly retrieve and record the user's creditor account information 115, and the monitoring processes 116 may analyze the retrieved information to determine whether the creditor has changed terms or status for the corresponding creditor account. In some examples, the monitoring processes 116 may also determine whether the credit amount which is owed by the customer increased (or decreased) an unexpected amount, and whether the increase of the credit amount owed by the user was because of an action or inaction of the user (e.g., user used credit card). The monitoring processes 116 may generate one or more alerts or notifications for the user based on the monitoring processes 116 a determination of an unexpected change to the creditor account information 115 of an enrolled creditor account.

In examples, the user interface component 110 includes a user dashboard 112 which graphically summarizes different aspects of the account management services. The user dashboard 112 can display, for example, deposit account information 121 (e.g., amount 123 available on the user's deposit account) and creditor account information 115 for individual creditor accounts (e.g., amounts owed on creditor accounts, amount remaining for user to pay under installment plan). In some examples, the user dashboard 112 displays information about the user's progress with the program 145. For example, the user dashboard 112 may display those creditor accounts which the user has settled through an account management service of the network system 100. In variations, the user dashboard 112 may also display portions of the user's payment plan 143, such as information about the next payment that is scheduled for the user (e.g., date of next payment, amount to be paid, etc.). Additionally, the user dashboard 112 may also display information (e.g., date and amount) of the user's next deposit contribution, as may be planned under the deposit schedule 125. Additional examples of functionality which may be provided with the dashboard 112 is described with other examples, including with an example of FIG. 2A.

Negotiation and Settlement

Credit payment planner 150 determines the payment plan 143 to reflect a time interval when a settlement with individual creditors may be initiated. Negotiation interface 148 can include processes to generate settlement proposals 155 for individual creditors, where each settlement proposal 155 takes into account a proposed settlement amount (which may be based on the percentage that the creditor is predicted to accept to settle the user's creditor account), a settlement date, and a payment type (e.g., one-time payment versus installment payment of settlement amount). According to some examples, the settlement proposals 155 include settlement terms that are based on predicted settlement decisions of the credit payment planner 150 for the particular creditor and creditor account. For example, at least some terms of a settlement proposal 155 for a particular creditor can be based on a percentage which the credit payment planner 150 predicts the creditor will accept in order to settle the outstanding amount owed by the user on a corresponding creditor account. In examples, the negotiation interface 148 can communicate settlement proposals 155 to creditors programmatically, using, for example, a pre-established messaging resource 15 of the creditor.

In some examples, the negotiation interface 148 can further initiate or otherwise implement a programmatic process to obtain a user authorization, for example, to make a settlement proposal 155 to a particular creditor, on behalf of the user, or to accept settlement offers negotiated on behalf of the user. The negotiation interface 148 can include form creation logic 156 to programmatically implement processes for generating communications that solicit required input or information from a corresponding user. To obtain authorization from the user, the negotiation interface 148 can execute the form creation logic 156 to generate a form (e.g., electronic document) or other structured text content. The form creation logic 156 can populate a set of designated fields of the form with (i) text content that includes content of the form (e.g., content to obtain user authorization to communicate a settlement proposal 155 on behalf of the user), and (ii) creditor account information obtained from the user record 101 for the creditor account that is to receive a settlement proposal 155 on behalf of the user. In some variations, the negotiation interface 148 can also access the creditor profile store 138 to identify whether the corresponding creditor has specific requirements (e.g., rules) regarding the content and administrator of an authorization form. The negotiation interface 148 can then structure the form as, for example, an authorization to communicate ("ATC") communication 147, which as described below, can be communicated to the user via the communicator 104. In such examples, once the user signals an affirmative response to the ATC communication 147, the negotiation interface 148 can communicate the settlement proposal 155 to the creditor.

If a settlement proposal 155 is accepted by the creditor, negotiation interface 148 can record certain terms of the settlement proposals 155 with the user record 101. In particular, the respective user records 101 may be updated to reflect the dates under which the user is to take certain actions (e.g., accept the proposed settlement, make additional deposit contribution(s), etc.).

Some examples provide that when a settlement proposal 155 that is communicated to a creditor is subsequently accepted by the creditor, the negotiation interface 148 receives and/or processes a settlement communication 149 for the respective user. The settlement communication 149 can be in the form of an agreement which the user can accept or reject. Once the user signals acceptance, the corresponding creditor account is deemed settled, under terms (e.g., proposed amounts) provided for in the settlement communication 149. Accordingly, under some examples, in order for a creditor account to be deemed settled, the negotiation interface 148 initiates a process to communicate the settlement communication 149 of the creditor to the user, as well as to receive and record a response (e.g., signaling acceptance by the user) by the user that can be communicated and/or otherwise verified for the creditor.

In variations, the negotiation interface 148 can monitor and/or facilitate communications exchanged through system 100 with creditors for purpose of settling creditor accounts of individual users. By way of example, the creditor may communicate alternative terms for settling the creditor accounts of individual users (e.g., different percentage of the outstanding owed than what was in the settlement proposal 155). The creditor can also respond to a settlement proposal 155 with a settlement communication 149 that includes terms which differ from the settlement proposal 155.

As an addition or variation, the negotiation interface 148 can include communication processing logic 158 to process communications from creditors. In examples, the negotiation interface 148 can implement one or more workflows for processing and handling communications from creditors and/or other third parties. In the course of a creditor account being settled, the negotiation interface 148 can receive, for example, a settlement communication 149 that is in the form of a letter. By way of example, the settlement communication 149 can be in the form of a document that is attached to or embedded with an email, communicated via fax, or sent by postal mail. For email communications, the negotiation interface 148 can be associated with one or more email accounts, and the negotiation interface 148 can implement communication processing logic 158 to monitor the associated email accounts for incoming emails that pertain to or contain settlement communications. The negotiation interface 148 can parse the body and header of incoming emails received on the associated email accounts for keywords, account identifiers, entity identifiers (e.g., creditor name), and other markers to make an initial determination as to the category of the incoming email, which may include a determination as to whether or not the incoming email pertains to or includes a settlement communication 149. If the incoming email is deemed to be associated with a settlement communication, the negotiation interface 148 can implement communication processing logic 158 to parse the contents of the email body and/or attachments. If an attachment is detected with the incoming email, communication processing logic 158 can, based on the detected file type of the attachment, initiate an optical character recognition ("OCR") process, to enable the content of the attachment to be parsed. In this way, the incoming email and its attachments can be processed to confirm that the communication pertains to a settlement communication 149, and further to identify a creditor, a creditor account number and a user for the settlement communication.

For fax communications, the negotiation interface 148 can be associated with one or more fax lines, and the negotiation interface 148 can implement communication processing logic 158 to monitor the associated fax lines for incoming faxes that may pertain to or contain settlement communications. The negotiation interface 148 can implement communication processing logic 158 to scan a facsimile transmission to determine a sender, and based on the sender, the document may be categorized as pertaining to a settlement communication 149. Communication processing logic 158 can initiate an OCR process to recognize the text of the fax, and further to parse the fax for creditor, creditor account number and user for the settlement communication.

In similar fashion, settlement communications 149 which are received through postal mail can be manually scanned, and communication processing logic 158 can subject the scanned documents to OCR processing and parsing, to identify creditor, creditor account number and user for the settlement communication. The negotiation interface 148 may also be linked to other communication identifiers to receive and process potential settlement communications in a similar fashion.

The negotiation interface 148 may then record the settlement communication 149 as part of a corresponding user's record 101. For example, the negotiation interface 148 can query the records management component 120 for the user record that matches the parsed information (e.g., creditor account identifier, user identifier) of an incoming settlement communication. The negotiation interface 148 can cause the communicator 104 to send an outbound communication 151 to the user which includes or integrates the settlement communication 149 of the creditor. Additionally, in some examples, once the user and subject of the incoming settlement communication 149 is identified, the negotiation interface 148 can retrieve the corresponding settlement proposal 155 to determine if significant deviations exist as between the settlement communication 149 communicated from the creditor and the settlement proposal 155 that was first sent by the network system 100.

In some examples, the negotiation interface 148 can process a settlement communication 149 and link the settlement communication 149 to the user's record. The network system 100 may include various communication processes ("communicator 104") which forward the settlement communication 149 to the user via one or more outbound communications 151.

In some examples, communicator 104 can implement a combination of processes to communicate the settlement communication 149 to the user through an outbound communication 151, transmitted using a selected one of multiple communication channels that are enabled for the communicator 104. For example, communicator 104 may transmit an outbound communication 151 that integrates the settlement communication 149 using a selected messaging channel (e.g., e-mail, SMS, email, social networking message platform, etc.). In such examples, communicator 104 includes processes to select an optimal communication channel for the user, as well as other communication parameters (e.g., time of day/week) for sending an outbound communication 151 to the user, based on, for example, the user's profile information 105. The user profile information 105 can, for example, identify a preferred communication channel(s) (e.g., e-mail, SMS messaging to user mobile device 16, social network messaging, telephone call, physical letter, etc.) of the user, based on user-input. For example, the user can be prompted to specify (e.g., during the onboarding process) one or multiple communication identifiers (e.g., mobile phone number, email, social network identifiers, etc.), as well as a preference or ranking in the user of the communication channels. In variations, the user may also be prompted to specify communication parameters, such as time of day or week when the user can be contacted by mobile number or through a particular communication channel.

Still further, in some variations, the user profile information 105 can include historical information about the user's responsiveness to outbound communications 151 that are communicated through one or multiple alternative channels. The communicator 104 can, for example, record a communication log for a given user as part of the user profile 105, where the communication log identifies each outbound and inbound communication from the user. For example, the communication log can include entries that record at least some outbound communications (e.g., those requiring a response from the user, such as ATC communications 147 and/or settlement communications 149), and each entry can identify the communication channel and identifier used for the respective outbound communication 151 (e.g., message that links to or attaches to an ATC communication 147 or settlement communication 149), along with timestamps and other metadata. Additionally, the individual entries of the communication log can record whether or not the outbound communication 151 received a response from the user, as well as metadata information such as the time and date of the reply communication 153.

In examples, the communicator 104 formats and/or structures an outbound communication 151 to include attachments, links or other data structures that link to a form, document or information that needs to be communicated to the user. The communicator 104 can include separate processes and/or logic to format and structure outbound communications 151 so that the outbound communications 151 properly integrates the form, document or information that is to be communicated to the user to accommodate a protocol and/or format of the selected communication channel. Thus, the communicator 104 can format and/or structure an outbound communication based on a selected communication channel.

Additionally, communicator 104 can configure outbound communications 151 to enable the user to provide a requested response 153. For example, in the case of ATC communications 147 and/or settlement communication 149, the respective outbound communication 151 can be optimized, or otherwise include functionality to enable the user's response to signal acceptance or rejection. In some examples, communicator 104 can structure ATC communications 147 and/or settlement communications 149 so that a reply from the user carries a binary value that is indicative of the user's acceptance or rejection (e.g., "Yes/No" for acceptance or rejection). To illustrate, the communicator 104 can integrate an ATC communication 147 and/or settlement communication 149 with an outbound communication 151, such that the outbound communication 151 includes a link which a corresponding user can use to view the ATC communication 147 or settlement communication 149 using a browser, with a requirement that the user respond to the message with a "Y" (for acceptance) or "N" (for rejection).

In examples, communicator 104 includes processes to monitor for the user's response 153. When a response 153 is received, communicator 104 can interpret the response and update the user record 101 to reflect the user's acceptance or rejection of the ATC communication 147 or settlement communication 149. In turn, the negotiation interface 148 can communicate the response 153 to the creditor via, for example, the creditor interface 15. By way of example, an outbound communication 151 (e.g., a message that integrates an ATC communication 147 or settlement communication 149) may be structured so that the user's response (e.g., reply message 152) automatically includes a predetermined character ("Yes" or "Y") that reflects the user's acceptance. In this way, the user can signal acceptance simply by performing an action of reply and transmit. Additionally, in some variations, the outbound communication 151 can be structured so that the user's reply message 153 automatically references the ATC communication 147 or settlement communication 149 that was integrated in the outbound communication 151.

The communicator 104 may further format and structure the outbound communication 151 to enable the user to change the value or text that is automatically generated by default in the user's reply communication 153 (e.g., such as when the user does not want to accept). When the reply communication 153 is received from the user, the communicator 104 may parse the header/body or other aspect of the incoming message to identify the predetermined character that was inserted by default (e.g., "Y" for acceptance). In this way, the communicator 104 is able to more efficiently and accurately process reply and other inbound communications from the user.

Still further, in some examples, communicator 104 can include processes that, for example, resend an outbound message 151 if no response is received from the user within a given time period. As an addition or variation, communicator 104 can select a new communication channel for the user if no response is received. Still further, communicator 104 can flag the user's record 101 so that additional follow up is performed to obtain a response from the user.

In some examples, negotiation interface 148 can record the terms of a settlement with the user record 101, where the recorded terms of the settlement are integrated with settlement logic 118 that is directed to promote adherence to the settlement by the user. The settlement logic 118 can, for example, trigger the communicator 104 to generate an outbound communication 151 that integrates the settlement communication 149 to the user, where the settlement communication 149 conveys terms of a settlement with a creditor to the user, pending the user's acceptance. The settlement logic 118 can also trigger the communicator 104 to repeat and/or escalate repeat transmission of the outbound communications that integrate the settlement communication 149 until the user responds.

Once the user accepts, the monitoring processes 116 can implement the terms of the settlement using settlement logic 118. Negotiation interface 148 can, for example, record the type of settlement (e.g., one-time payment versus installment payment), the amount of the payment (if one-time payment is term of settlement) or installment payment (if installment is term of settlement), and the due date(s) for the respective payments. The account monitoring processes 116 can implement the settlement logic 118 to, for example, (i) monitor for the user response to the settlement proposal within prescribed period of time, (ii) monitor deposit account information 121 of the user to ensure deposit contributions of the user account for the user's settlement, and (iii) send follow up communications to the user, via the communicator 104 to ensure the user takes necessary actions (e.g., make payment to deposit account, etc.).

When the user accepts the settlement of the creditor account, the credit payment planner 150 can update the payment schedule 143 of the user to reflect changes (if any) to the user's deposit schedule 125 and payment plan 143. For example, if the settlement is for an installment that is greater than what was predicted, the payment plan 143 may reflect an increase to the user's deposit schedule as a result of higher installment payments. Likewise, if the payment plan 143 anticipated a one-time payment to the creditor, and the settlement provides for a series of installment payments, the payment plan 143 may reflect the installment payments as opposed to the one-time payment. Likewise, when a settlement requires a series of installment payments, the deposit schedule 125 may be modified to account for any unexpected difference between individual installment payments and the amount that was planned for the user's deposit contributions over a corresponding time interval.

In some examples, the account monitoring processes 116 can implement the settlement logic 118 to trigger the deposit account manager 126 to initiate payment from the deposit account 12 to the creditor of a settled creditor account on a given date, in accordance with the terms of the settlement. Thus, for example, the user may make contributions to the deposit account 12, and the deposit account manager 126 can direct payment from the deposit account 12 to a creditor in accordance with the terms of the settlement. The account monitoring processes 116 may further implement the settlement logic 118 to mark when a creditor account is fully settled. For example, if a creditor account requires installment payments, the creditor account is marked fully settled when the last installment payment is timely made.

Default Scenario Determinations

For settled creditor accounts, the user's record 101 may reflect both the creditor account information 115 of the account prior to settlement and the settlement amount. The negotiation interface 148 may also record any penalties or added costs which may be incurred by the user if the user defaults on the settlement. During a time interval between when a settlement is accepted and when the settlement is deemed fully settled for a creditor account, the forecaster 142 can continue to generate creditor account forecast information 139 for the settled creditor account.

In examples, the forecaster 142 can generate simulation(s) that assume the user defaults on the settlement at a given time after the settlement is made. Under a default scenario, the forecaster 142 calculates the creditor account forecast information 139 for the settled creditor account, including additional fees or penalties resulting from the user's default, less amounts which the user paid prior to the point of default. In this way, in the event the user indicates inability to meet the terms of an accepted settlement, the forecaster 142 can use the creditor account forecast information 139 to generate a default scenario for the user, where the total cost of the user defaulting on the settlement is displayed to the user via the user dashboard 112. For example, if the user is unable to make an installment payment under the terms of a settlement with a creditor, creditor account forecast information 139 for that creditor account can be used to generate the amount that the user would likely owe to the creditor as a consequence of the user defaulting on the settlement.

The forecaster 142 can generate a default scenario based on an input signal that indicates a point in time when the user is likely to be in default of a settlement. For example, the monitoring processes 116 can implement the settlement logic 118 to monitor the deposit account 12 for deposit contributions of the user based on the deposit schedule 125. If the monitoring processes 116 detect the user is likely to miss his next deposit contribution (e.g., no deposit contribution is made by the user 1 day after due date under deposit schedule 125), the settlement logic 118 may trigger the forecaster 142 to generate and display the default scenario to the user via the user dashboard 112.

In some examples, the forecaster 142 can generate alternative default scenarios for the user as a response to user input. For example, the user may interact with the user dashboard 112 to reduce, skip or delay one or more deposit contributions that the user is scheduled to make under the deposit schedule 125. By way of example, the user may enter an alternative (and lesser) payment amount for one or multiple upcoming contributions of the deposit schedule, via an interface feature of the dashboard 112. The forecaster 142 can calculate the user's shortfall over a remaining duration of the user's program 145. For example, if a revised deposit schedule 125 affects the payment plans 143 to multiple creditors at one time, then the shortfall at each monthly interval can calculated for the user, and a point in time when the user is in default of a settled creditor account can be noted, with the amounts which the user would owe under the default scenario displayed in response to the user input.

Aggregated Settlements

In some examples, the planning sub-system 140 includes an aggregation settlement component 144 for use in negotiations of settlement proposals. The aggregation settlement component 144 can, for example, query the records management component 120 to identify other users who are, under their respective programs 145, scheduled to settle with a specific creditor during a same time interval (e.g., same month). The aggregation settlement component 144 can aggregate the settlement amounts for each user, and negotiation interface 148 can generate the settlement proposal 155 for the specific creditor so that it provides for the creditor accounts of multiple users at one time. In this way, system 100 is able to leverage scale, where, for example, tens, hundreds or thousands of users can settle accounts with a common creditor in a given month. Examples recognize that settlement proposal(s) to creditors have more appeal when more accounts can be settled at the same time. As such, through scale of numbers, negotiation interface 148 can use the aggregation of settlements to generate settlement proposals 155 that are more likely to be accepted and under more favorable terms to users (e.g., lower percentage requirement, etc.).

Moreover, by settling multiple accounts at one time, the negotiation interface 148 can be implemented more efficiently. Rather than settlement proposals being generated for individual creditor accounts, the negotiation interface 148 can generate a single settlement proposal 155 for the creditor accounts of multiple users that share a common creditor. Thus, for example, the number of communications which may be needed between the negotiation interface 148 and the creditor (e.g., via the creditor resource 15) can be reduced. For example, rather than provide the negotiation interface 148 to separately communicate with the creditor on each user's status (whether the user accepted or rejected the proposed settlement), the negotiation interface 148 can communicate one or more lists that show the acceptance status of each user who was negotiated in a given settlement proposal. In this way, the bulk handling of settlement greatly reduces the computational overhead required as between system 100 and creditors.

When negotiation interface 148 generates the settlement proposals 155 for creditors, the results of the settlement proposals can be recorded as historical information with the corresponding creditor profile of the creditor profile store 138. To illustrate, a creditor can accept a settlement proposal, reject a settlement proposal, reject a settlement proposal 155 with a counter-proposal, or generate a settlement communication 149 that accepts or modifies the original settlement proposal. In some examples, when the creditor accepts a settlement proposal 155, the corresponding historical information that is recorded for the creditor may re-enforce the model which predicted the creditor's actions. On the other hand, when the creditor rejects a settlement proposal 155, or when the terms of the settlement are renegotiated in a manner that significantly deviates from settlement decisions that were predicted for that creditor, negotiation interface 148 may flag the corresponding creditor profile for reevaluation. In some examples, a score to reflect the reliability of the settlement decisions of the creditor may be downgraded to reflect uncertainty by the recent creditor decisions. When a creditor profile is marked for reevaluation, additional historical information may be recorded and/or further analysis may be performed (e.g., tune model to predict creditor's settlement decision), to generate more accurate predictions of the creditor's settlement decisions.

In this way, negotiation interface 148 may trigger credit payment planner 150 to query the records management component 120 to retrieve user records 101, to identify users with programs 145 that include open payment plans 143 for the particular creditor. For those users, credit payment planner 150 may redetermine portions of the respective programs 145. For example, the payment plan 143 for the respective users may be reprioritized to downgrade the priority of the particular creditor, to reflect the relative uncertainty of predicted settlement decisions which may have been made about the creditor. For those users, the respective payment plans may be modified so that another creditor is prioritized for the next settlement under the respective user's payment plan 143.

Methodology

Figure 2A:
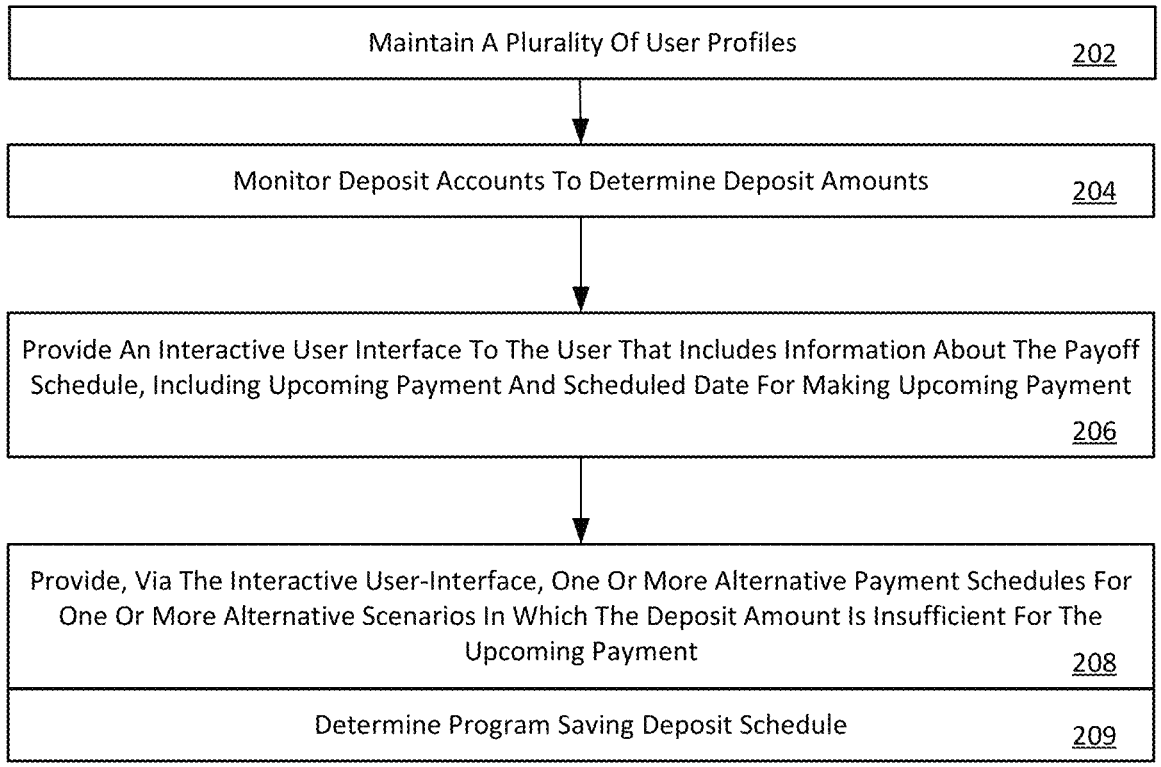
FIG. 2A through FIG. 2C illustrate examples of account management services provided through use of a network computing system.
Figure 2B:
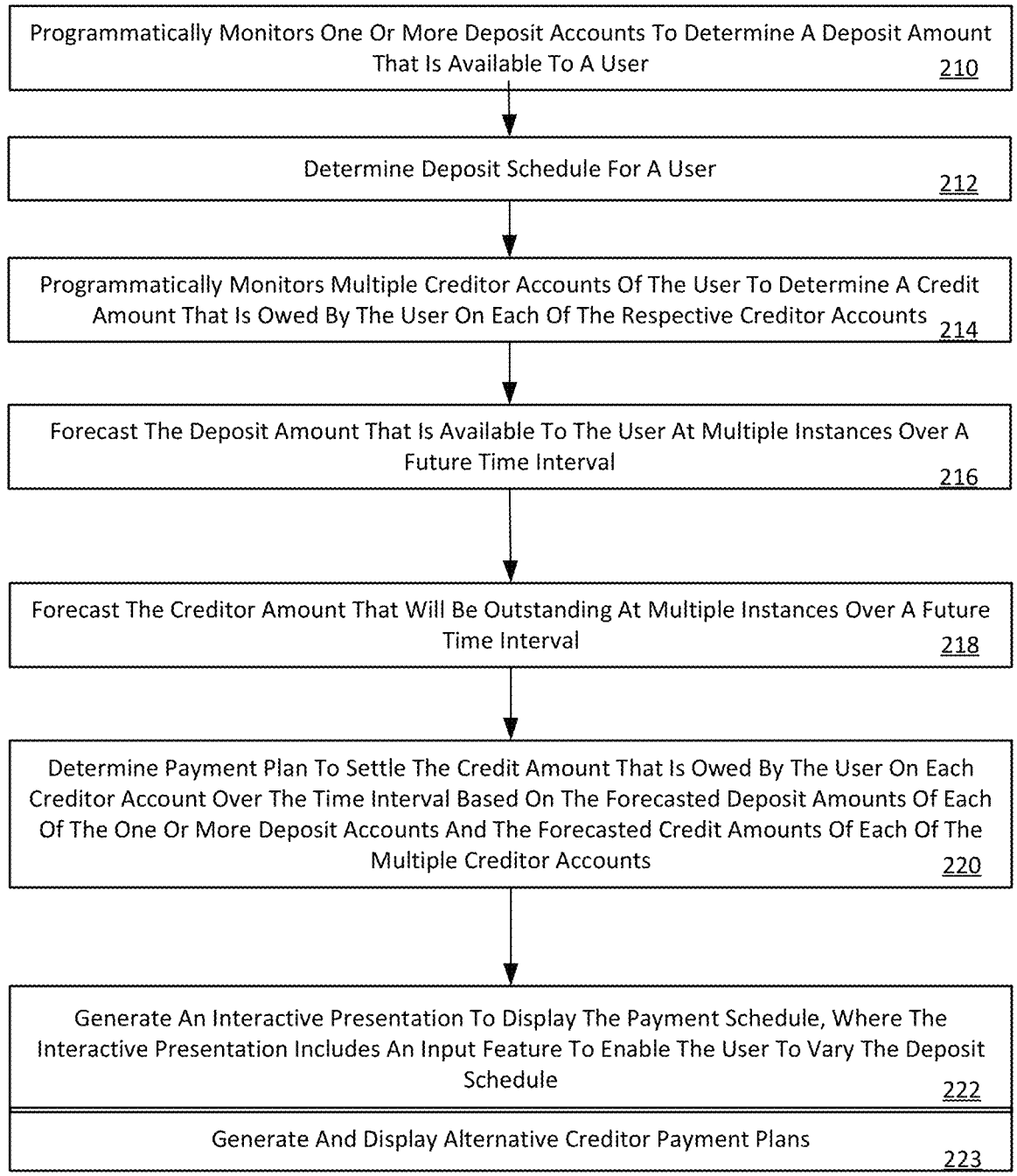
Figure 2C:
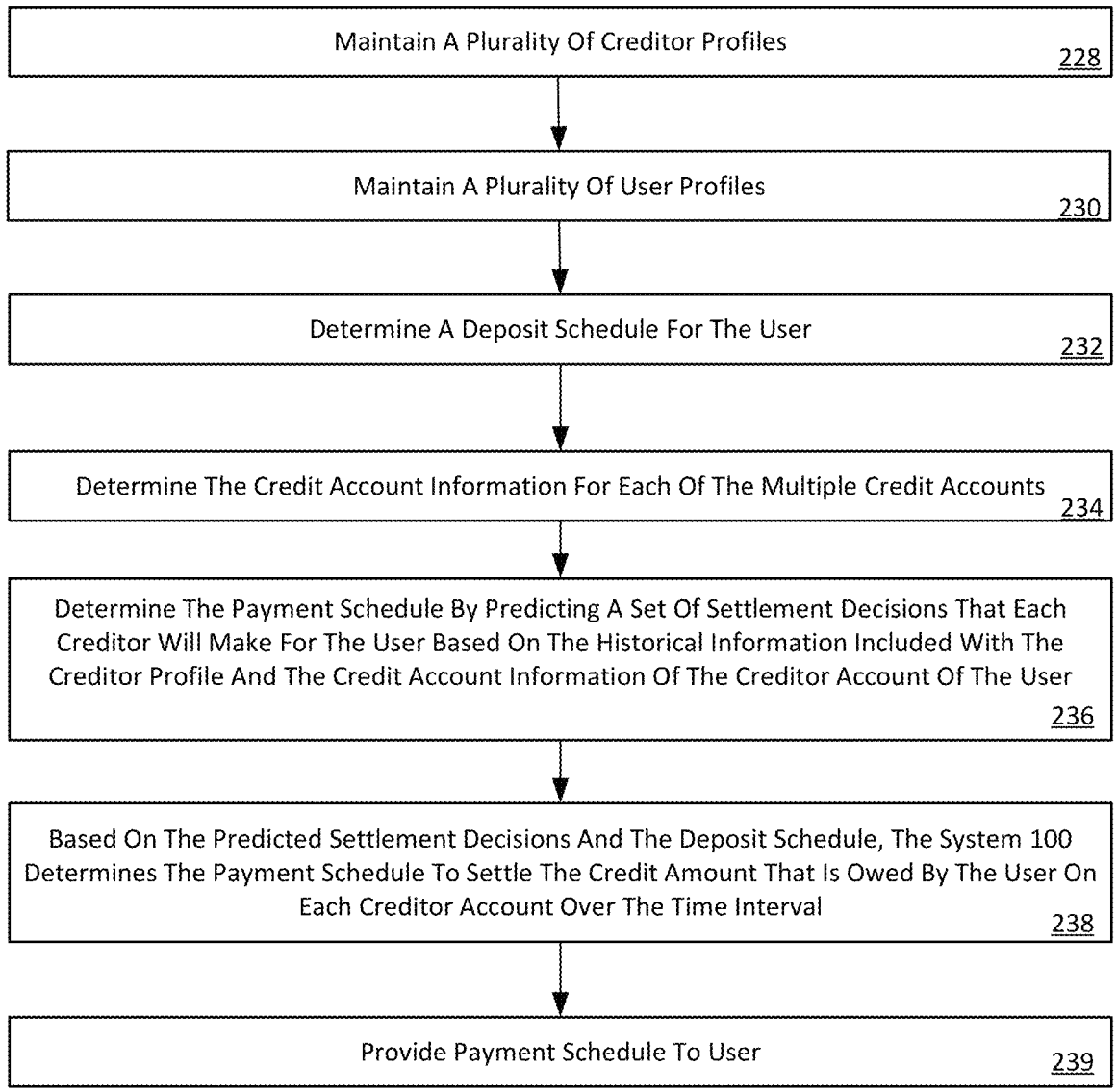

FIG. 2A through FIG. 2C illustrate methods for providing account management services on a network computing system, according to one or more examples. In describing examples of FIG. 2A through FIG. 2C, reference is made to elements of an example of FIG. 1 for purpose of illustrating a suitable component for performing a step or sub-step being described.

With reference to an example of FIG. 2A, the network system 100 maintains user profiles for individual users of the account management services (202). Each user profile may associate an identifier of the user with each of (i) a deposit account, (ii) a creditor account associated with a corresponding creditor, and (iii) a creditor payment schedule which schedules individual payments towards creditor accounts of the user. For example, the network system 100 may utilize credit payment planner 150 to generate a creditor payment plan 143 that schedules payment from the user's deposit schedule to one or multiple creditors. Depending on the user's progression in the corresponding program 145, the credit payment plan 143 can include planned payments in anticipation of settlements (e.g., one-time payments), and installment payments that are the result of a settlement of one or more of the user's creditor accounts. Thus, when the user has settled a creditor account under installment terms, the credit payment plan 143 can schedule, on, for example, a monthly basis, (a) an installment payment that is to be made from the user's deposit account to the creditor on one or multiple scheduled dates, and (b) a portion of an expected settlement amount that the user has remaining to pay under the payment schedule to settle an amount originally owed to the creditor.

The network system 100 can continuously or repeatedly monitor the deposit account 12 to determine the user's current deposit amount (204). The monitoring process can, for example, be performed on a periodic basis (e.g., daily, weekly or monthly), or in response to specific events (e.g., after user is scheduled to make a deposit contribution). The monitoring process can verify, for example, that the user has made a scheduled contribution to the deposit account, as well as the total amount available to the user. In this way, the monitoring of the user's deposit account can ensure that the user's deposit contributions are sufficient for required creditor payments that include installment payments to creditors for settled creditor accounts payments towards expected settlement amounts for creditor accounts that have not yet been settled.

The network system 100 can generate an interactive user-interface 110 to provide information about scheduled payments of the user, as indicated by the payment schedule (206). The user interface component 110 can, for example, generate an interactive presentation 108 that include information about an upcoming payment and a scheduled date for making the upcoming payment. In examples, the network system 100 can generate the user dashboard 112, to display information that is indicative of the user's progress through the individualized program 145.

The network system 100 may further provide, via the interactive user-interface 110, one or more alternative payment schedules for one or more alternative scenarios in which the deposit amount is insufficient for the upcoming payment (208). In some examples, system 100 provides an alternative payment schedule in response to user input, provided through, for example, the user dashboard 112.

In examples, the dashboard 112 includes one or more input features that enables the user to simulate the results of the program in the event the user specifies input to modify the amounts of the user's deposit contributions over an upcoming duration. As another example, the user dashboard 112 may include an input feature that enables the user to simulate an alternative payment schedule where the user skips or reduces one payment, or delays one or more upcoming payments. In such examples, the user dashboard 112 can signal the forecaster 142 to generate one or more alternative deposit schedules 125 based on proposed user input, under the objective to prevent a material change to the user's program 145.

In response to user input to lower one or more scheduled deposit contributions, the forecaster 142 can determine, based on the input provided by the user, a monthly shortfall that the user will incur for each remaining interval of the user's program. As a response to the user input, the forecaster 142 can determine a program saving deposit schedule 129 for the user that avoids the user's program from being materially impacted (209). As a response to the user input, the forecaster 142 can determine a program saving deposit schedule 129 for the user that avoids the user's program from being materially impacted. In examples, the program saving deposit schedule 129 can identify a minimum payment amount the user can make under a given time frame (e.g., within 3 months) to prevent default of a settlement that is receiving installment payments, and/or delay in the payment schedule 143 of other creditor accounts in the user's program 145.

Additionally, in some variations, the forecaster 142 can make a determination as to whether the user will likely be in default of a settlement as a result of the proposed input provided through the dashboard 112. If the determination is that the user will be in default, the forecaster 142 can generate and display the amounts the user would owe under the default scenario. Thus, the default scenario may be displayed alongside the program saving deposit schedule 129, so that the user is fully informed as to the minimum requirements which are needed for the user to avoid default of a settled creditor account.

In many situations, the deposit schedule 125 may decrease over time, meaning the user's proposed input is inadequate for only a portion of the remaining duration under the user's program. For example, the deposit schedule 125 for the user may plan for reduced deposit contributions from the user in a time period following an anticipated settlement with a creditor account, or upon full settlement of a creditor account that is subject to installment payment (e.g., last installment payment made). Thus, in some cases, the forecaster 142 can determine that the proposed user input would generate a monthly shortfall for a duration of time, but the monthly shortfall would become positive after a point in time in the future (e.g., after when last installment payment is made for settled creditor account). In such examples, the program saving deposit schedule 129 can reflect a one-time supplementary payment which the user can make, where the amount is determined by the largest monthly shortfall.

With reference to an example of FIG. 2B, the network system 100 programmatically monitors one or more deposit accounts to determine a deposit amount that is available to a user (210). The deposit account 12 may be monitored and managed through the deposit account manager 126, using interface(s) 128 for enabling the user to access one or multiple deposit account sites. At the time of enrollment, the user can link the user's deposit account 12 with the user identifier 103 (e.g., account number with account management service of system 100). The user may provide, for example, credentials to enable system 100 to remotely login and perform certain management actions. In examples, the network system 100 can implement processes to programmatically retrieve deposit account information 123, which can identify the amount which the user has on deposit and the user's account activities (e.g., history of deposits, including amount and date). The network system 100 can also implement processes to direct payment from the deposit account 12 to the creditor accounts of the user.

Once the user is enrolled, the network system 100 can determine a deposit schedule 125 for the user (212). The deposit schedule 125 can account for an existing amount which is held in the deposit account. Additionally, the deposit schedule 125 can identify a deposit contribution that the user is expected to make, to increase the deposit amount through a series of contributions that the user can make over a time interval that extends to a future completion date.

According to examples, system 100 programmatically monitors multiple creditor accounts of the user to determine a credit amount that is owed by the user on each of the respective creditor accounts (214). In examples, each of the creditor accounts are associated with a set of creditor account parameters, including an interest rate parameter that identifies a rate at which an amount owed on the creditor account increases.

Based at least in part on the deposit schedule, the network system 100 can forecast the deposit amount that is available to the user at multiple instances over a future time interval (216). The forecaster 142 can, for example, determine a summation of the contributions of the user over a given interval, less amounts which are expected to be paid to creditor accounts based on the payment plan 143.

Additionally, for each of the multiple creditor accounts, the network system 100 can forecast, based at least in part on the interest rate of the creditor account, the credit amount that will be outstanding on the creditor account at multiple instances of the time interval (218). For example, the forecaster 142 can determine the amount owed on individual creditor accounts based on an existing amount owed, an interest rate, and penalties which the account may accumulate based on an expected user action.

In examples, the network system 100 determines a payment plan 143 to settle the credit amount that is owed by the user on each creditor account over the time interval based on the forecasted deposit amounts of each of the one or more deposit accounts and the forecasted credit amounts of each of the multiple creditor accounts (220). For example, the credit payment planner 150 can determine the he payment plan 143 for the user, where the payment plan 143 identifies a predicted payment date settlement amount for each creditor account of the multiple creditor accounts based on the creditor account information 115 of the respective creditor accounts.

The network system 100 can generate an interactive presentation to display the payment schedule, where the interactive presentation includes an input feature to enable the user to vary the deposit schedule (222). In response to varying the deposit schedule, the network system 100 can run simulations that generate alternative creditor payment plans 143 for the user (223). For example, the user may interact with an input feature of the user dashboard 112, to provide an input to vary the deposit schedule. The input can trigger the forecaster 142 to update the creditor account forecast information 139 for a remaining duration of the program, and the credit planning component 150 can redetermine the payment plan 143 for the creditors based on the update to the deposit schedule 125. The dashboard 112 can also update the interactive presentation to display the alternative creditor payment plan based on the user input.

With reference to an example of FIG. 2C, the system maintains a credit profile for a plurality of creditors (228). The network system 100 may maintain, for example, a library of creditor profiles, with individual creditor profiles including historical information that system 100 collects about respective creditors from a variety of sources. For example, the network system 100 can provide account management services to numerous users, and the network system 100 can record settlement results others users may have with respect to individual credits. In this manner, the network system 100 records such historical information, which includes information that indicative of one or multiple settlement decisions the creditor has made in a prior time interval for users of system 100.

The network system 100 can also maintain a user profile for each of the plurality of users of the account management services (230). In examples, each user profile may associate an identifier of the user with each of (i) one or more deposit accounts, (ii) multiple creditor accounts, each of the multiple creditor accounts being associated with a corresponding creditor of the plurality of creditors, and (iii) a payment schedule that identifies a payment date and a settlement amount for each creditor account of the multiple creditor accounts, where the payment schedule identifies a completion date when each of the multiple creditor accounts are settled.

In determining the payment schedule for a given user, the network system 100 may determine a deposit schedule for the user, where the deposit schedule identifies a deposit amount contribution that the user is expected to make to the deposit account (232).

In determining the payment schedule, the network system 100 may also determine the creditor account information 115 for each of the multiple creditor accounts (234). The creditor account information 115 can identify, for example, (i) a credit amount that is owed by the user on each of the multiple creditor accounts, and (ii) a delinquency state of the creditor account; and (iii) one or more creditor account parameters, including an interest rate parameter that identifies a rate at which the credit amount owed on the creditor account increases.

Additionally, for each creditor account of the user, the network system 100 can determine the payment schedule by predicting a set of settlement decisions that each creditor will make for the user based on the historical information included with the creditor profile and the creditor account information of the creditor account of the user (236). In examples, the set of settlement decisions may include (i) a date range corresponding to a portion of the time interval during which the user can be delinquent on making payment to the account without the creditor of the creditor account triggering a collection escalation, (ii) a percentage of the credit amount that the creditor will accept as a settlement amount to settle the credit amount in full, and (iii) a payment type which the creditor will accept for payment of the settlement amount.

Based on the predicted settlement decisions and the deposit schedule, the network system 100 determines the payment schedule to settle the credit amount that is owed by the user on each creditor account over the time interval (238).

The network system 100 can provide the payment schedule to the user (239). In examples, the payment schedule is provided through, for example features of the dashboard 112.

Figure 2D:
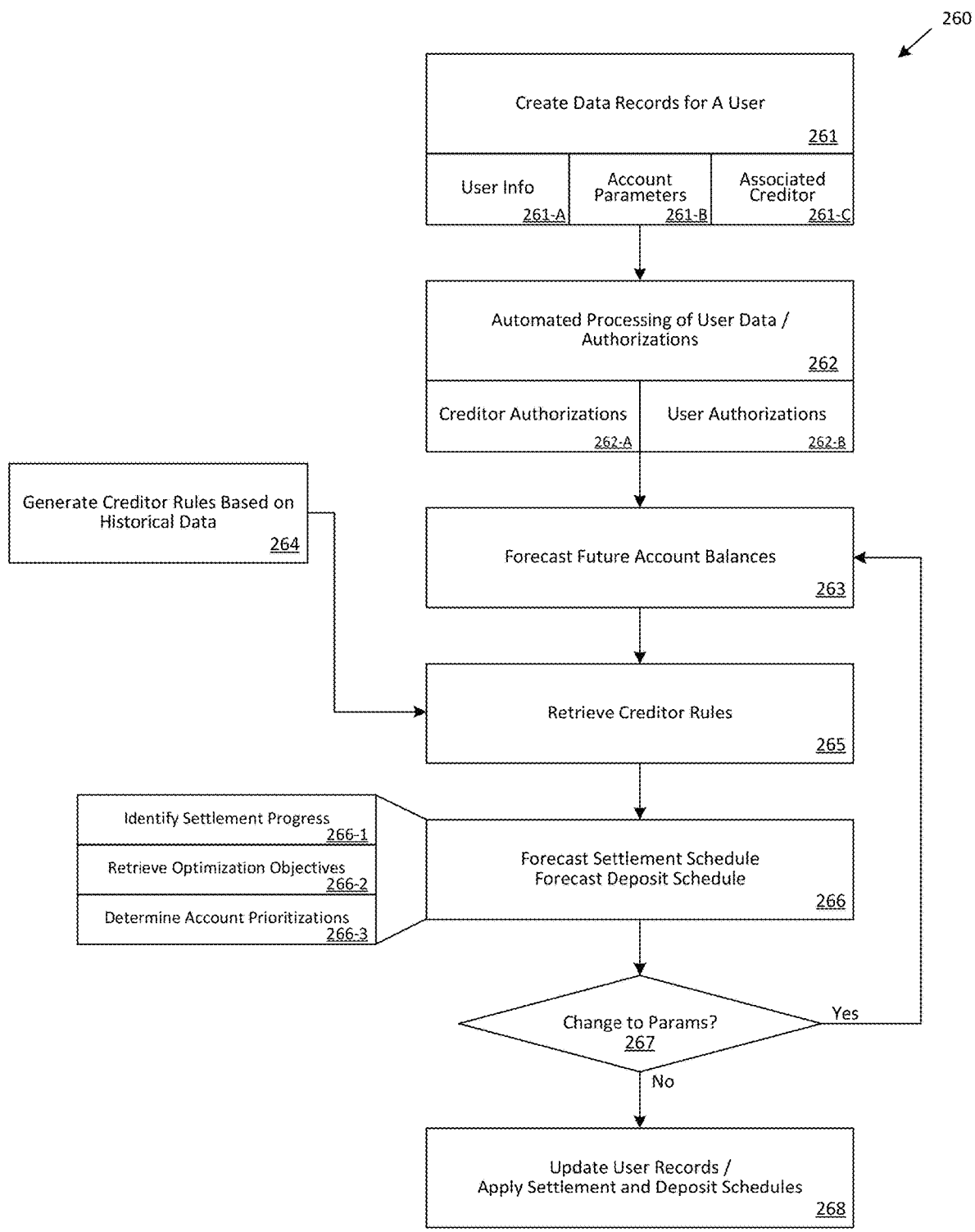
FIG. 2D illustrates an example method of determining account prioritization for a particular user.

FIG. 2D illustrates an example method of determining account prioritization for a particular user. In the below discussion of FIG. 2D, reference may be made to features and examples shown and described with respect to FIG. 1. For instance, the method 260 of FIG. 2D can be performed by exemplary network system 100 illustrated in and described with respect to FIG. 1.

Referring to FIG. 2D, the method 260 performed by network system 100 can determine an account prioritization for a user in association with a network-based service to manage the user's accounts. Depending on the particular implementation, the network-based service can correspond to an intelligent settlement service of the user's financial accounts (e.g., loan accounts, creditor accounts, etc.) and method 260 can be used to determine the account prioritization for the user in the settlement of the accounts. The determination of the account prioritization can be based on a simulation-based optimization performed based on forecasted account balances, a user deposit schedule, and creditor rules.

In more detail, at step 261, the network system 100 can create and maintain a data record for a user. For example, the network system 100 can generate and maintain a user record 101, which can be stored with the user record store 119. The user record 101 for an account can include information such as user information 261-A, account parameters 261-B, and associated creditor information 261-C.

According to embodiments, the user information 261-A maintained in the user record 101 can include information such as the user's identification, contact, and/or demographic information. In some examples, user information 261-A can further include information that can be helpful to the network system 100 in determining an account settlement plan and/or the account prioritization for the user including, for example, the user's credit information, income information, and other related financial data. Depending on the implementation, the account parameters 261-B can correspond to information relating to each of the user's accounts and can include parameters such as outstanding balance, interest rate, payment due date, account status (e.g., delinquency state, amount of time in delinquency, collection status, etc.), and the like for each of the user's accounts enrolled with the network-based service. Furthermore, the associated creditor information 261-C can include information pertaining to a corresponding creditor for each of the accounts of the user enrolled with the network-based service. For instance, the creditor information 261-C can indicate the identity and contact information of the creditor.

At step 262, the network system 100 can perform automated processing of user data and/or authorizations for the settlement of the user's accounts. Depending on the implementation, the network system 100 can be configured to automatically retrieve the user account information or parameters for each enrolled of the user. As the enrolled accounts are generally third-party accounts, the user account information can be maintained at one or more other servers (e.g., servers of financial institutions servicing or maintaining the user accounts). For instance, the AIRS 130 can include processes that prompt the user to input (e.g., via a webpage or via a user application executing on a user device that communicates with the network system) login credentials for each of the accounts of the user. As an addition or as an alternative, the user can grant the network system 100 access to the user accounts without directly providing login credentials (e.g., via OAuth). The account updater 134 can, for example, periodically access the user accounts using the login credentials or the granted access to retrieve account information necessary to maintain and/or update the corresponding user records. For instance, the network system 100 can retrieve one or more account parameters to update the account parameters 261-B maintained in the user record. The account parameters current outstanding account balance, interest rate, current status (e.g., delinquency status, status with respect to collections or account sell-off etc.). As an alternative, the user can input the account parameters (e.g., via a webpage or via a user application interfacing with the network system) instead of the network system retrieving the account information or parameters automatically. As a further alternative, the network system 100 can access telephony systems provided by financial institutions to retrieve the account information or parameters (e.g., by placing an automated call to the telephony system, accessing the automated voice prompt menus provided by the telephony system, and performing programmatic voice to text transcription to retrieve account information or parameters).

In certain implementations, the network system 100 can automatically process creditor authorizations for the settlement of the user accounts (262-A). The network system 100 can further automatically process user authorizations for the settlement of the user accounts (262-B).

At step 263, the network system 100 can forecast future account balances and determine a deposit schedule for the user. In the context of FIG. 1, this step can be performed by, for example, the forecaster 142 and the credit payment planner 150. For example, network system 100 can forecast estimated account balances based on the retrieved (or inputted) current account balances of each of the user accounts, interest rates of each of the user accounts, and penalties which each of the accounts may accumulate during the settlement process.

At step 264, the network system 100 can retrieve creditor rules. The creditor rules can include information pertaining to each of a plurality of creditors that interface with the network-based service. A given user has accounts with only a subset of the plurality of creditors (e.g., as identified by associated creditor information 261-C). The information included in the creditor rules can indicate, for each creditor, a credit timeline, which can indicate a timeline of predicted events for the accounts associated with the particular creditor and the timing of the predicted events. The timing of the predicted events can be indicated by a time range and can be indicated as a relative time to other events associated with the account. For example, a credit timeline can indicate that, for a first creditor, accounts associated with the first creditor are usually sold off to collections 12 to 18 months from the time the account goes into delinquency (e.g., when the user stops making payments to the account). As another example, the credit timeline can further indicate that a second creditor usually takes legal action against delinquent accounts 6 to 9 months after not receiving a payment.

According to embodiments, the creditor rules can further include a relative creditor ranking of the plurality of creditors. The relative creditor ranking can indicate a preference in prioritizing the repayment of a particular creditor's accounts in comparison to accounts of other creditors (e.g., based on settlement terms offered to users via the network-based service). Depending on the implementation, a given creditor can be identified by the creditor rules as having one of a plurality of creditor rankings. For instance, there can be ten creditor rankings and the first creditor can be identified as "rank 1" while the second creditor can be identified as "rank 3," with rank 1 being prioritized over rank 3. In practice, when determining account prioritization of the user having a first account with the first creditor and a second account with the second creditor, the account prioritization process can prioritize the first account over the second account in determining the optimal account prioritization for the user. Furthermore, the relative creditor ranking applied to an account of the user can vary depending on the status of the account or a timeline associated with the account. For instance, the first account associated with the first creditor can be identified as rank 1 up to 6 months of the account being delinquent and identified as rank 3 after 6 months of the account being delinquent. As a result, the relative rankings for each of the accounts of the user can depend on the particular situation of the user.

The creditor rules can be determined by the network system 100 at step 265, which can be separate and independent from the process flow to generate the account prioritization of the particular user. The network system 100 can determine the creditor rules based on monitoring and analyzing historical data associated with individual creditors. For example, the creditor payment planner 150 can utilize historical data of individual creditors, as maintained with creditor profile store 138, including prior settlement terms, events, and timelines associated with settlements (and settlement proposals) as between the respective creditors and users of the network system 100. The network system 100 can employ a machine-learning process to analyze the historical data associated with the users of the network-based service to generate the creditor rules. In certain implementations, administrators can further manage or alter the creditor rules.

At step 266, the network system 100 can determine a settlement schedule and a deposit schedule based on the forecasted account balances, determined deposit schedule, and the creditor rules. This determination can be made based on an optimization process to achieve one or more optimization objectives in settling the user's accounts.

In more detail, the network system 100 can identify a current settlement progress 266-1 for the user. The current settlement progress 266-1 can signify the current progress of the user in completing the settlement process for the totality of the user's accounts. Depending on the implementation, the user's account settlement process can be segregated into a first segment, a second segment, and a third segment. As an example, the first segment can correspond to a first duration of the network-based service for the user (e.g., the first six months that the user has been enrolled in the account settlement program), the second segment can correspond a second duration of the network-based service for the user (e.g., the subsequent twelve months), and the third segment can correspond to the remainder of the network-based service (e.g., the last 30 months of the account settlement program).

According to embodiments, the network system 100 (e.g., through processes described with the creditor payment planner 150) can retrieve a set of optimization objectives 266-2 in determining the optimal account prioritization for the user. The optimization objectives (and/or their relative priority or importance) can be dependent on the settlement progress 266-1. For example, during the first segment, the optimization objectives can include an optimization objective to achieve a settlement milestone (e.g., reach a settlement with a creditor for one of the accounts of the user) as quickly as possible and an optimization objective of reaching the most optimal settlement terms possible for the user. Depending on the implementation, during the first segment, the optimization objective of reaching a settlement objective as quickly as possible can have a higher priority than the optimization objective of reaching the most optimal settlement terms for the user. During the second segment, the optimization objective can be reaching the most optimal settlement terms for the user. And during the third segment, the optimization objective can be reaching the termination date (e.g., the date at which all accounts are settled) as quickly as possible. And while each of the segments can have varying optimization objectives (and/or varying priorities for those optimization objectives), the segments can also share common optimization objectives. For instance, the optimization objective of avoiding legal action on the part of the creditor can be an objective that has the highest priority for each of the segments.

In various implementations, the network system 100 can apply user parameters (e.g., forecasted account balances and deposit schedule) to the retrieved creditor rules and optimization objectives in determining the optimal account prioritization for the user in settling the user's accounts 266-3. Depending on the implementation, in applying the user parameters to the retrieved creditor rules and optimization objectives, the network system 100 can determine an account prioritization for the user that indicates at what time each of the accounts of the user should be settled to best meet the optimization objectives.

Depending on the implementation of the network-based service, the user can periodically contribute to a deposit account 12 for settlement of the user's accounts. At step 266, the network system can forecast the settlement schedule for the user in settling each of the user's accounts and the deposit schedule for the deposit account 12. Depending on which account is to be prioritized, the settlement schedule can vary (e.g., based on the outstanding account balance, interest rate, any accumulated penalties, and acceptable settlement offers to the creditor for each of the accounts). Accordingly, the network system can forecast the settlement schedule (e.g., which can reflect the timing and amounts needed to settle one or more of the user's accounts) based on the forecasted future balances (e.g., determined at step 264), and determined account prioritizations (e.g., determined at step 266-3). In addition, at step 266, the network system can determine, based on the forecasted settlement schedule, the deposit schedule for the user in contributing to the deposit account 12 to facilitate the settlement of the user's accounts.

At step 267, the network system 100 can monitor the user records to determine whether any of the parameters associated with the user has been modified. In response to detecting a change to any of the parameters associated with the user, the network system 100 can re-perform the steps 263-266.

For instance, in various implementations, the network system 100 is configured to provide to a user device (e.g., a computer or mobile device of the user) one or more user interfaces to dynamically adjust parameters in determining the settlement and/or deposit schedules. For example, the network system 100 can provide user interfaces (e.g., see FIG. 3A through FIG. 3C) to enable the user to adjust one or more parameters (e.g., periodic deposit amount) and dynamically view the results (e.g., change to deposit schedule and termination date, change to total amount required for settlement, etc.) within the user interface. The network system 100 can determine a modified settlement and/or deposit schedules in response. For instance, if the user decreases the contribution amount, the settlements and deposit schedules may have to be lengthened in response. As another example, the network system can be further configured to update the settlement and/or deposit schedules based on updated creditor rules.

At step 268, the network system 100 can update the user record with the determined settlement and deposit schedules. For instance, one or more user interfaces for presentation on the user device (e.g., an interface on a webpage accessed by the user, an interface presented on a user application) can be updated to reflect the account prioritization determined using method 260.

Example User Dashboard

Figure 3A:
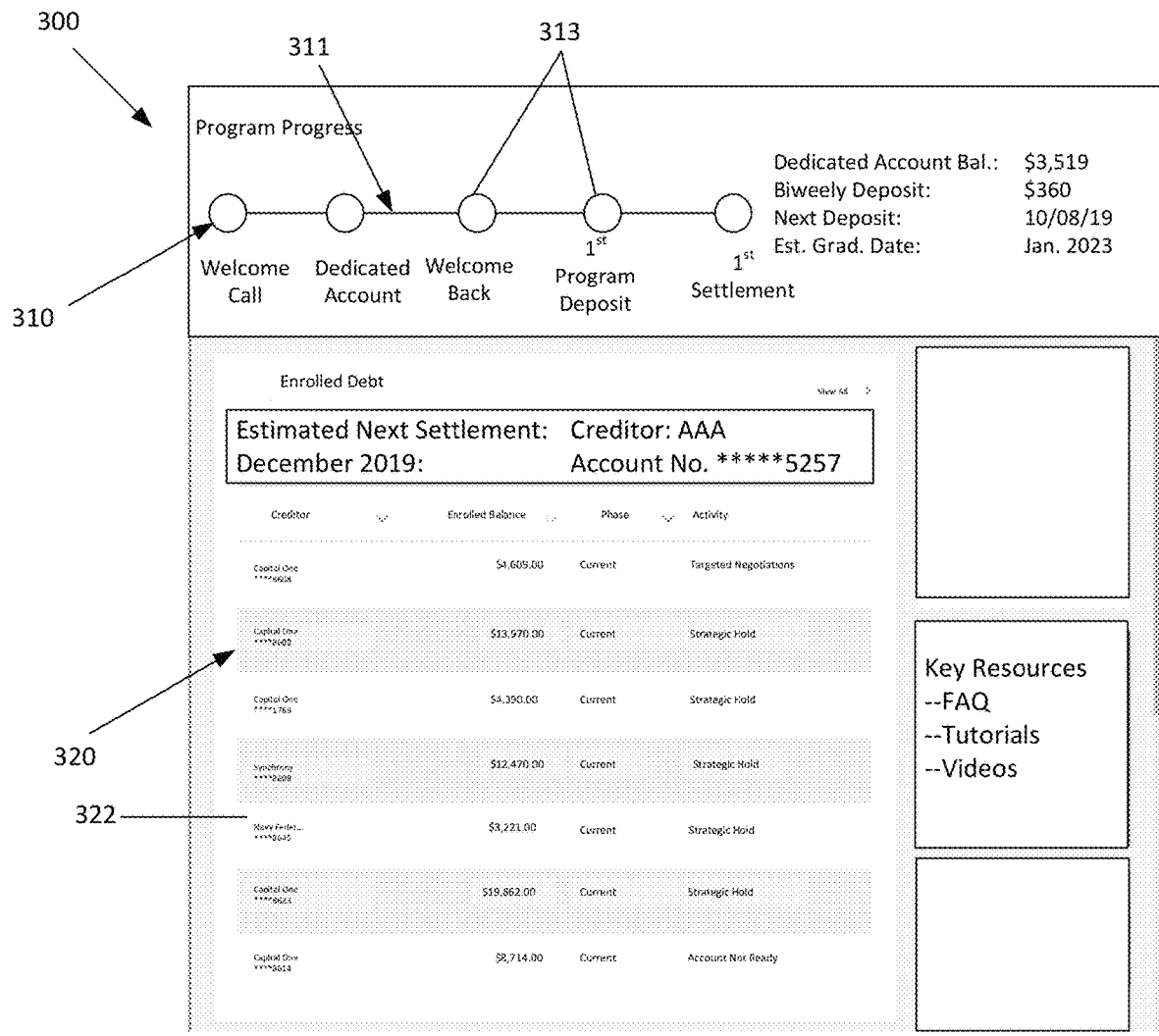
Figure 3B:
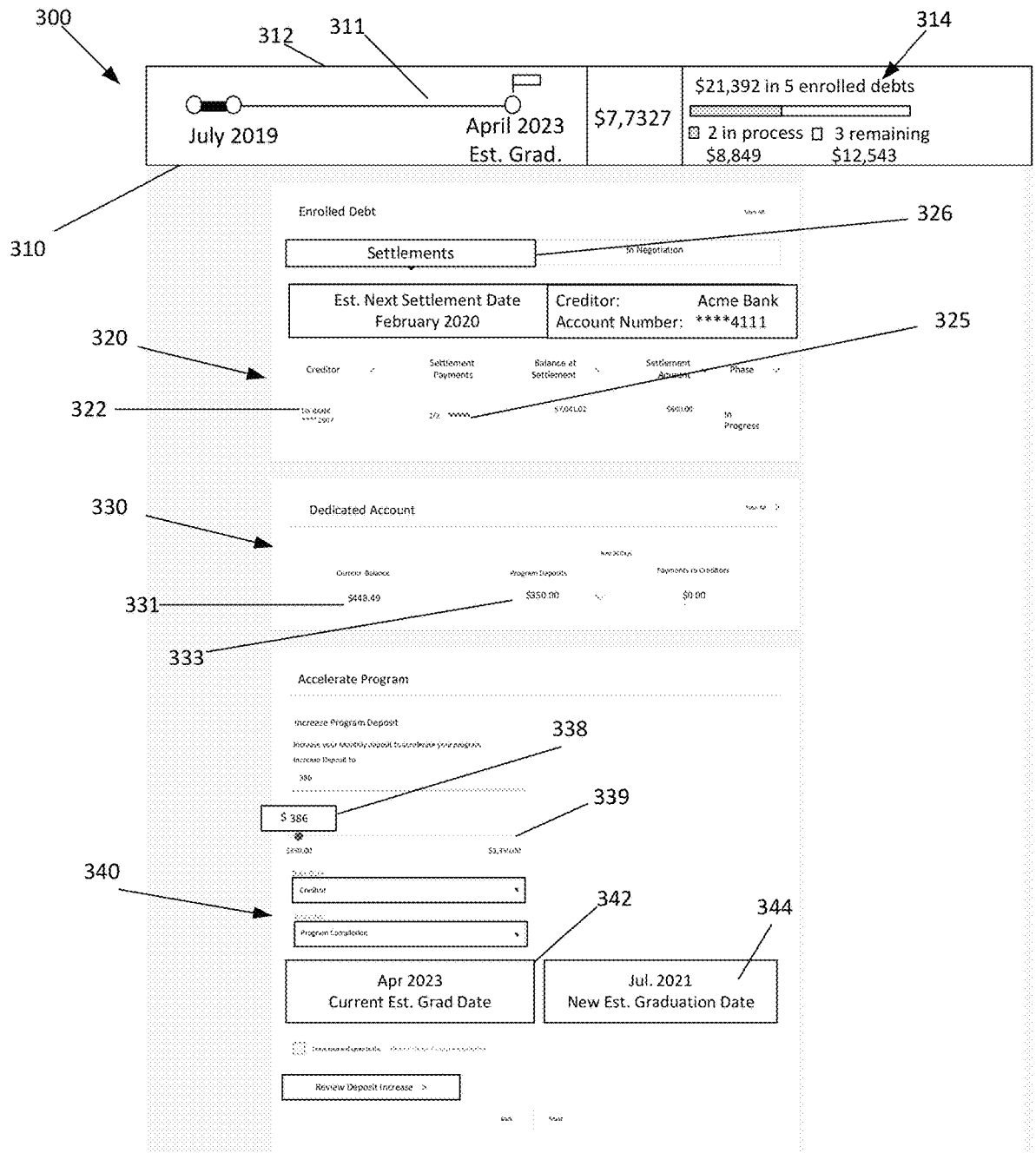

FIG. 3A through FIG. 3C illustrate examples of a user dashboard for utilizing account management services, according to one or more examples. A user dashboard 300, such as shown by FIG. 3A through FIG. 3C, can be generated by and/or in connection with account management services of network computing system 100 (see FIG. 1). Accordingly, user dashboard 300 may correspond to an implementation of the user dashboard 112, and reference may be made to elements of FIG. 1 for purpose of illustrating functionality for generating and/or enabling use of the user dashboard 300.

In FIG. 3A, the dashboard 300 displays a summary of the user's program. The dashboard 300 can be representative of a newly enrolled user, and the information displayed to the user can collectively provide a summary of the user's program 145. In an example shown, the dashboard 300 includes a program progress panel 310 and a creditor account enrollment panel 320. The program progress panel 310 includes a timeline feature 311 that represents a planned duration for the user's program 145, where the planned duration may be predetermined (e.g., 2 or 4 years) or customized based on user specific information or preferences. The timeline feature 311 can also include milestone markers 313 which visually indicate expected milestones for the user (e.g., first settlement). In variations, the milestone markers 313 can represent predicted milestones, such as an approximate date and amount of settlements which are predicted for the user accounts.

The enrollment panel 320 can list one or multiple entries 322, where each entry 322 corresponds to an enrolled creditor account of a given user. In examples, each entry 322 identifies a corresponding creditor and creditor account, as well as the enrolled balance of the creditor account, reflecting the amount owed on the creditor account at the time of the user's enrollment. Each entry 322 may also identify a settlement phase of the creditor account. In examples, the settlement phase of each creditor account can include a designation of i) upcoming—meaning settlement of the creditor account is subject to further actions of the user (e.g., accumulation of the deposit contributions of the user for a proposed settlement); ii) current—meaning the creditor account is subject to negotiations in accordance with a predetermined strategy; iii) in progress—meaning an enrolled debt has an authorized settlement in progress; and iv) resolved—meaning the creditor account has fully settled.

Initially, the enrollment panel 320 can summarize the actions which the user is to take on the creditor accounts. Some creditor accounts can be identified as "strategic holds" meaning the user is to take no action outside of the program 145 to pay the creditor account. The determination of the creditor accounts which are subject to "strategic holds" can be based on the predicted settlement decisions of each creditor and creditor account. For example, the creditor planning component 150 can predict an optimal timeframe in the future when a creditor is receptive to a settlement proposal from a delinquent debtor. The creditor planning component 150 can also predict a likely timeframe where the user can take no action and become delinquent without the creditor taking action to escalate collection of the delinquent creditor account. Based on the creditor planning component 150 making such predicted settlement decisions, the creditor planning component 150 can structure the payment plan 143 for the user such that the user's deposit contributions are accumulated towards settling one selected creditor account at a time, or more generally, settling one or more of the user's creditor accounts over a particular duration while delaying settlement of others creditor accounts. In an example of FIG. 3A, each entry 322 of the enrollment panel 320 informs the user of the particular account that is targeted first or next for settlement, while settlement of other accounts are to be delayed pending further delinquency by the user.

In an example of FIG. 3B, the user has made several deposit contributions towards the user's program. The timeline feature 311 of the progress panel 310 provides information about a user's progress through their program 145. A progress indicator 312 can be positioned along the timeline feature 311 to visually indicate a portion of the overall program that the user has successfully completed, as well as to visually indicate a portion of the program 145 which is remaining. Thus, for example, the combination of the timeline feature 311 and the progress indicator 312 can visually summarize a number of deposit contributions which the user has made over the completed portion of the program 145.

In an example of FIG. 3B, the program progress panel 310 also displays various types of user-specific information that summarizes various types of metrics and information about the progress of the user. By way of example, the user specific information can include an amount of debt which is targeted for elimination by the user's participation in the program 145, as well as the number of deposit contributions that the user has left to make over the remainder of their program 145.

Additionally, program progress panel 310 can be generated to include an enrolled account summary 314, which can display the number of enrolled accounts of the user, the total amount the user owed when the accounts were enrolled, and the number of creditor accounts that have a particular status or phase (e.g., 'completed, 'in-progress', 'remaining' (or 'current'), etc.).

In examples, the enrollment panel 320 can display information about the financial state of each creditor account which the user has enrolled with an account management service of the network system 100. The financial state information can include indicators of whether the creditor account has settled, is in process of settling (e.g., user is making installment payments to resolve), or not settled. Additionally, the financial state information can identify the amount of debt that is currently associated with the creditor account.

In an example of FIG. 3B, the enrolled creditor account is in progress, meaning the creditor account has settled, and there remains one or more installment payments which the user has to make to complete the settlement. As described with other examples, the terms of the creditor's settlement can be programmatically determined, such as through processing of the creditor's settlement communication. The negotiation interface 148 can record specific terms which require action on the part of the user (e.g., amount and schedule for installments).

In examples, the dashboard 300 can provide a separate view of the enrollment panel 320, to reflect creditor accounts that are in different phases (e.g., "settlements" versus "in negotiation"). The user can manipulate a toggle feature 326 to toggle between the alternative views. In the settlements view, the creditor account enrollment panel 320 lists each creditor account that is in the phase of "in progress"— meaning the creditor account has settled under terms which require the user to provide installment payments. Each entry 322 of the enrollment panel 320 can identify the creditor and creditor account, as well as the balance of the creditor account at the time of settlement and the settlement amount (e.g., which may be a percentage of the balance at settlement amount). Each entry 322 can also include a progress feature 325 for the in-progress creditor account to reflect a number of payments which the user made towards an installment settlement as compared to the total number of payments that are to be made.

In examples, the deposit account panel 330 identifies the deposit amount 331 available in the deposit account 12. The deposit account 330 can also specify a next payment 333 which the user is scheduled to make, along with the time frame when that payment is to be made by the user. Additionally, the deposit account panel 330 can identify upcoming payments of the user's deposit schedule 125. As described with some examples, network system 100 can implement the deposit account manager 126 to access and direct deposit amounts from the user's deposit account 12 to the user creditor, for payment of an amount owed in connection with a settlement. In this way, the deposit panel 330 can display one or more future installment payments or other payment obligations of the user for an upcoming time interval, so that the user has advance notice of upcoming withdrawals from the user's deposit account 12, given the withdrawals may be done automatically through the deposit account manager 126.

According to examples, the dashboard 300 may also include one or more dynamic and interactive program panels 340. In an example of FIG. 3B, the dashboard 300 can provide an interactive program panel 340 to enable the user to simulate a change to the user's program by changing the deposit schedule 125. The program panel 340 can include one or more types of input features to enable the user to change one or more deposit contributions of the deposit schedule 125. In examples, the dashboard 300 may include an alphanumeric entry feature 338 and/or a continuous input mechanism 339 (e.g., slider) to enable the user to specify an amount of a current or reoccurring deposit contribution.

Additionally, the program panel 340 may include visual indicators 342, 344 to represent changes to the user's program based on the user input. A first indicator 342 may represent a current duration remaining on the user's program 145, and a second indicator 344 may be dynamic to indicate an alternative duration for the program 145 based on the change in the deposit schedule 125. In some implementations, a dimension of the second indicator 344 may increase or decrease in response to the user's input. For example, based on user input to increase the deposit schedule, the dimension of the second visual indicator 344 may decrease in proportion to the reduction in time of the user's program 145. In this way, the first and second visual indicators 342, 344 provide a visual comparison for the user, to enable the user to visually comprehend the difference in the duration remaining on the program 145 as a result of the user increasing or decreasing the deposit contributions to the user's program 145.

In examples, the user may change an amount of individual deposit contributions on a reoccurring basis, or with respect to a select deposit contribution or set of deposit contributions. Still further, the user may specify input for the simulation in the form of more or fewer deposit contributions for the deposit account 12 (e.g., user skips payment, user adds an extra payment, etc.).

In response to user input to change or modify the deposit schedule 125, the dashboard 300 communicates with network system 100 (e.g., forecaster 142) to receive data that is indicative of an updated targeted settlement date. In this way, the dashboard 300 can be used to generate input for the forecaster 142, to enable the forecaster 142 to determine simulations of the user's program based on the user input. The dashboard 300 can render the updated targeted settlement date 347 of the simulations using visual indicators 342, 344. For example, the dashboard 300 can change the dimension or other visual characteristic of the visual indicator 344, such that the comparison to visual indicator 342 reflects a difference between the current and simulated duration of the program 145.

An example of FIG. 3B illustrates a case where the user input is to increase the amount of the user's deposit contributions, such as by increasing each planned deposit contribution remaining on the user's program, and/or by adding one-time deposit contribution. In response, the second visual indicator 344 is shown to shrink in dimension, to reflect a difference between the current completion date and that of the simulation. Thus, in response to the user entering input to change the deposit schedule 125, at least one of the first visual indicator 342 (representing the current program duration) or the second visual indicator 344 (representing the simulated program simulation) may be changed to reflect a difference in the duration of the current program as compared to the simulation.

In examples, the user's input provided via the continuous input mechanism 339 can cause a corresponding one of the visual indicators 344 to dynamically change in dimension and/or other visual characteristic to reflect the difference as between the current and simulated programs. The dynamic change to, for example, the visual indicator 344 may be made in real-time, as a response to, for example, the user manipulating the continuous input mechanism 339 and/or repeatedly providing input to alter an aspect of the deposit schedule 125.

FIG. 3C illustrates a result panel 360 for an implementation of the dashboard 300 in which a user input is to reduce the user's deposit schedule 125. For example, the user may specify input, via the interactive program panel 340, to skip or reduce a next deposit contribution, or to reduce a series of the user's deposit contributions going forward. The reduction in the deposit amount available in upcoming intervals can have multiple negative consequences, such as extending the duration of the program. Additionally, in some cases, the reduction in the deposit contributions of the user can cause the user to default on a settlement agreement that is in progress (or subject to installment payments).

To inform the user of consequences of the reduction to the deposit contributions, the dashboard 300 can trigger simulations to the user's program based on the proposed deposit schedule 125. The simulations can be performed using, for example, processes such as described with an example of FIG. 2A, and the results of the simulations can be displayed to the user in a result panel 360. If the result of the simulation includes a delay in the completion date of the user's program, then the result panel 360 can display a message 362 or other content that is indicative of the delay. Additionally, if the result of the simulation is that the user will go into default on an in-progress settlement, then the result panel 360 can include a default warning 364 to the user. The default warning 364 can include information such as the creditor account that will be in default. Additionally, the default warning 364 may identify the amount the user will owe on the defaulted settlement, which may be based on settlement terms which typically provide that the users' default will apply retroactively in terms of payments and interest. As an addition or alternative, the dashboard can provide the user with a revised or saving deposit schedule 129 to save the user's program, as described with an example of FIG. 2D. The user may choose the action to take based on the information provided with the dashboard 300, as illustrated by the result panel 360.

Network Computing System

Figure 4:
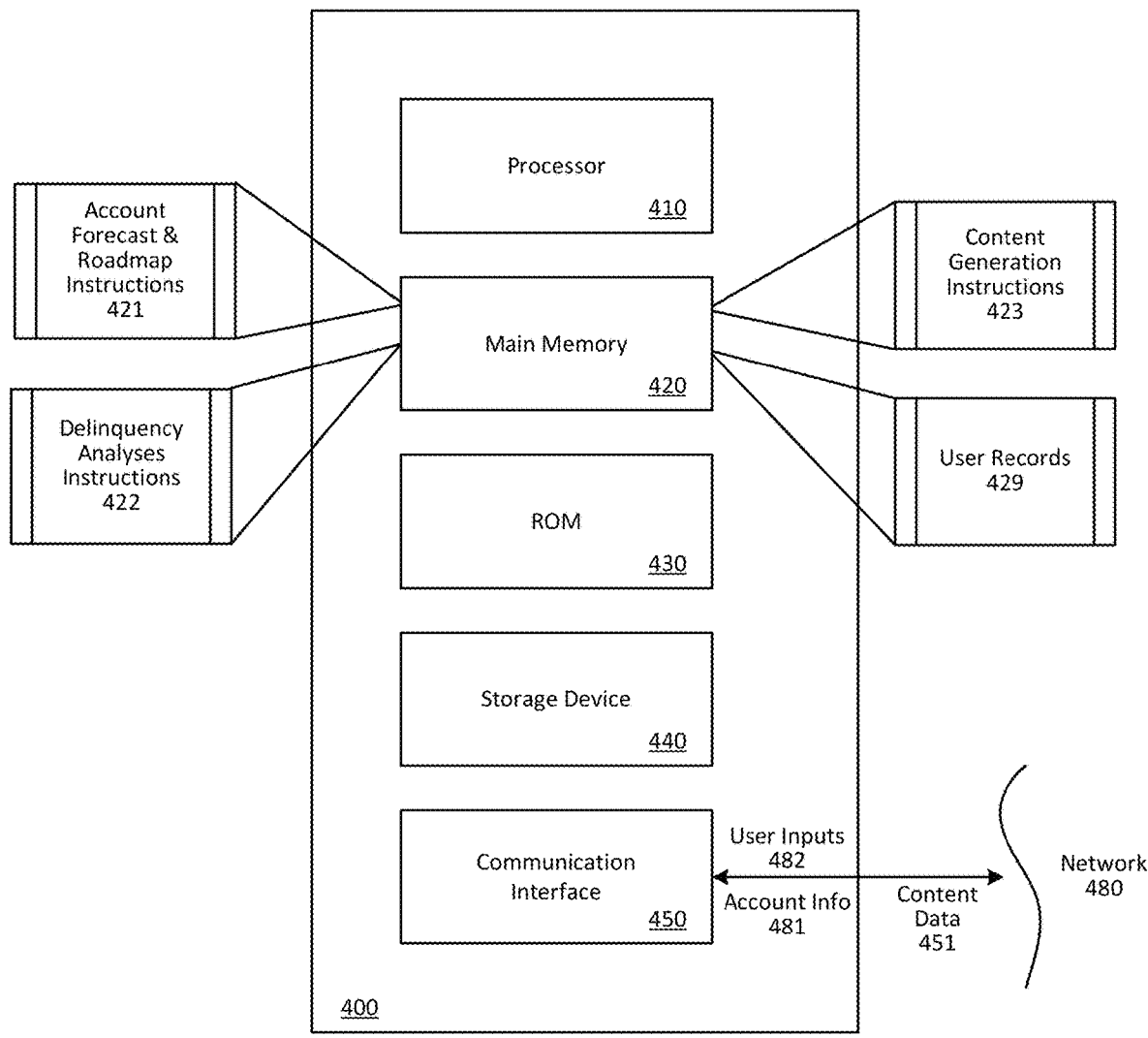
FIG. 4 illustrates a network computing system on which account management services can be provided, according to one or more examples.

FIG. 4 is a block diagram that illustrates a computer system upon which examples described herein may be implemented. A computer system 400 can be implemented on, for example, a server or combination of servers. In the context of FIG. 1, the network system 100 may be implemented using a computer system 400 such as described by FIG. 4. The network system 100 may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions.

The communication interface 450 enables the computer system 400 to communicate with one or more networks 480 through use of the network link (wireless or wired). Using the network link, the computer system 400 can communicate with one or more computing devices (e.g., user devices) and/or one or more servers (e.g., to retrieve account information of one or more users).

The executable instructions stored in the memory 420 can also include content generation instructions 423, which enable the computer system 400 to generate content, such as the user interfaces illustrated and described with respect to FIG. 3A to FIG. 3C. The executable instructions further include account forecast and roadmap instructions 421 and delinquency analyses instructions 422, which enable the computer system to retrieve user records 429 in order to perform functions such as those illustrated and described with respect to FIGS. 2A through 2D.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
one or more processors;
memory to store instructions;
wherein the one or more processors execute the stored instructions to perform, for each user of a plurality of users, operations that include:
  maintaining a user profile that associates an identifier of the user with each of (i) a deposit account of the user, (ii) one or more creditor accounts of the user, each creditor account being associated with a corresponding third-party creditor;
  determining a deposit schedule and a payment schedule, wherein the deposit schedule identifies an amount that the user is to contribute to the deposit account on multiple occasions over an upcoming time interval;
  predicting, (i) a first time frame during which the user is to delay making a payment towards at least a first creditor account of the one or more creditor accounts, and (ii) a second time frame after the first time frame, during which a proposal to settle the first creditor account for a settlement amount that corresponds to a portion of the amount owed under the first creditor account is to be made for or on behalf of the user, wherein predicting the second time frame includes determining that the corresponding creditor of the first creditor account is likely to accept the proposal being at least in part on historical information associated with the corresponding creditor of the first creditor account;
  wherein the payment schedule identifies one or more payments that are to be made from the deposit account to each of the one or more creditor accounts on one or multiple scheduled dates to settle the one or more creditor accounts during the upcoming time interval, each of the one or more payments being based at least in part on (i) a projected available amount of the deposit account based on the deposit schedule and the payment schedule, (ii) creditor account forecast information that forecasts a future state of each credit account, and (iii) the settlement amount of the first creditor account and the predicted second time frame;
  wherein determining the deposit schedule and the payment schedule includes determining a duration of the upcoming time interval so that the one or more payments of the payment schedule settle the one or more creditor accounts;
  providing an interactive user-interface to the user, the interactive user-interface including (i) information about the payment schedule, including an upcoming payment and a scheduled date for making the upcoming payment, (ii) one or more visual indicators that indicate the duration of the upcoming time interval and a portion of the settlement amount that is currently remaining to be paid to the first creditor account, and (iii) a continuous input mechanism that is operable by the user to specify an alternative amount for the upcoming payment and one or more subsequent payments; and
  in response to the user operating the continuous input mechanism, (i) repeatedly determine the deposit schedule and the payment schedule based on the alternative amount specified by input received from the user manipulating the continuous input mechanism; and (ii) update in real-time each of the one or more visual indicators that indicate the duration of the upcoming time interval; and (iii) based at least in part on the input, provide, via the interactive user-interface, an indication of when an amount of the deposit account is insufficient for the upcoming payment.

2. The network computer system of claim 1, wherein the one or more processors determine, based at least in part on the input received from the continuous input mechanism, whether the user will be in default to one of the creditors, based on a set of pre-existing terms of the respective creditor account.

3. A method for providing accounting services, the method being implemented by one or more processors of a network computer system, wherein for each user of a plurality of users, the method comprising:
  maintaining a user profile that associates an identifier of the user with each of (i) a deposit account of the user, (ii) one or more creditor accounts of the user, each creditor account being associated with a corresponding third-party creditor;
  determining a deposit schedule and a payment schedule, wherein the deposit schedule identifies an amount that the user is to contribute to the deposit account on multiple occasions over an upcoming time interval;
  predicting, (i) a first time frame during which the user is to delay making a payment towards at least a first creditor account of the one or more creditor accounts, and (ii) a second time frame after the first time frame, during which a proposal to settle the first creditor account for a settlement amount that corresponds to a portion of the amount owed under the first creditor account is to be made for or on behalf of the user, wherein predicting the second time frame includes determining that the corresponding creditor of the first creditor account is likely to accept the proposal being at least in part on historical information associated with the corresponding creditor of the first creditor account;
  wherein the payment schedule identifies one or more payments that are to be made from the deposit account to each of the one or more creditor accounts on one or multiple scheduled dates to settle the one or more creditor accounts during the upcoming time interval, each of the one or more payments being based at least in part on (i) a projected available amount of the deposit account based on the deposit schedule and the payment schedule, (ii) creditor account forecast information that forecasts a future state of each credit account, and (iii) the settlement amount of the first creditor account and the predicted second time frame;
  wherein determining the deposit schedule and the payment schedule includes determining a duration of the upcoming time interval so that the one or more payments of the payment schedule settle the one or more creditor accounts;
  providing an interactive user-interface to the user, the interactive user-interface including (i) information about the payment schedule, including an upcoming payment and a scheduled date for making the upcoming payment, (ii) one or more visual indicators that indicate the duration of the upcoming time interval and a portion of the settlement amount that is currently remaining to be paid to the first creditor account, and (iii) a continuous input mechanism that is operable by the user to specify an alternative amount for the upcoming payment and one or more subsequent payments; and in response to the user operating the continuous input mechanism, (i) repeatedly determining the deposit schedule and the payment schedule based on the alternative amount specified by input received from the user manipulating the continuous input mechanism; and (ii) updating in real-time each of the one or more visual indicators that indicate the duration of the upcoming time interval; and (iii) based at least in part on the input, providing, via the interactive user-interface, an indication of when an amount of the deposit account is insufficient for the upcoming payment.

4. The method of claim 3, wherein the method further comprises determining, based at least in part on the input received from the continuous input mechanism, whether the user will be in default to one of the creditors, based on a set of pre-existing terms of the respective creditor account.

5. A non-transitory computer readable medium that stores instructions, which when executed by one or more processors of a network computer system, cause the network computer system to perform, for each user of a plurality of users, operations that include:

maintaining a user profile that associates an identifier of the user with each of (i) a deposit account of the user, (ii) one or more creditor accounts of the user, each creditor account being associated with a corresponding third-party creditor;

determining a deposit schedule and a payment schedule, wherein the deposit schedule identifies an amount that the user is to contribute to the deposit account on multiple occasions over an upcoming time interval;

predicting, (i) a first time frame during which the user is to delay making a payment towards at least a first creditor account of the one or more creditor accounts, and (ii) a second time frame after the first time frame, during which a proposal to settle the first creditor account for a settlement amount that corresponds to a portion of the amount owed under the first creditor account is to be made for or on behalf of the user, wherein predicting the second time frame includes determining that the corresponding creditor of the first creditor account is likely to accept the proposal being at least in part on historical information associated with the corresponding creditor of the first creditor account;

wherein the payment schedule identifies one or more payments that are to be made from the deposit account to each of the one or more creditor accounts on one or multiple scheduled dates to settle the one or more creditor accounts during the upcoming time interval, each of the one or more payments being based at least in part on (i) a projected available amount of the deposit account based on the deposit schedule and the payment schedule, (ii) creditor account forecast information that forecasts a future state of each credit account, and (iii) the settlement amount of the first creditor account and the predicted second time frame;

wherein determining the deposit schedule and the payment schedule includes determining a duration of the upcoming time interval so that the one or more payments of the payment schedule settle the one or more creditor accounts;

providing an interactive user-interface to the user, the interactive user-interface including (i) information about the payment schedule, including an upcoming payment and a scheduled date for making the upcoming payment, (ii) one or more visual indicators that indicate the duration of the upcoming time interval and a portion of the settlement amount that is currently remaining to be paid to the first creditor accounts, and (iii) a continuous input mechanism that is operable by the user to specify an alternative amount for the upcoming payment and one or more subsequent payments; and in response to the user operating the continuous input mechanism, (i) repeatedly determining the deposit schedule and the payment schedule based on the alternative amount specified by input received from the user manipulating the continuous input mechanism; and (ii) updating in real-time each of the one or more visual indicators that indicate the duration of the upcoming time interval and the amount remaining to be paid to the one or more creditor accounts; and (iii) based at least in part on the input, providing, via the interactive user-interface, an indication of when an amount of the deposit account is insufficient for the upcoming payment.

\* \* \* \* \*